(12) United States Patent
Takizawa et al.

(10) Patent No.: US 6,948,856 B2
(45) Date of Patent: Sep. 27, 2005

(54) ROLLING BEARING DEVICE AND RING WITH SENSOR FOR THE ROLLING BEARING DEVICE

(75) Inventors: Takeshi Takizawa, Kanagawa (JP); Shigeru Endo, Kanagawa (JP); Kouichi Morita, Kanagawa (JP); Yoshio Shoda, Kanagawa (JP); Hiromasa Fukuyama, Kanagawa (JP); Toshio Takahashi, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/985,921

(22) Filed: Nov. 6, 2001

(65) Prior Publication Data

US 2002/0054719 A1 May 9, 2002

(30) Foreign Application Priority Data

| Nov. 6, 2000 | (JP) | P. 2000-338151 |
| Jan. 16, 2001 | (JP) | P. 2001-007792 |
| Feb. 22, 2001 | (JP) | P. 2001-046674 |
| May 22, 2001 | (JP) | P. 2001-152805 |
| Sep. 27, 2001 | (JP) | P. 2001-298353 |

(51) Int. Cl.$^7$ ............................................. F16C 19/08
(52) U.S. Cl. ..................................................... 384/448
(58) Field of Search ................................. 384/448, 446, 384/544; 374/174

(56) References Cited

U.S. PATENT DOCUMENTS

| 4,688,951 A | * | 8/1987 | Guers ........................... 384/446 |
| 4,932,245 A | | 6/1990 | Shelton |
| 5,200,697 A | | 4/1993 | Adler et al. |
| 5,231,391 A | | 7/1993 | Rigaux |
| 5,372,435 A | | 12/1994 | Genero et al. |
| 5,440,184 A | | 8/1995 | Samy et al. |
| 5,585,577 A | | 12/1996 | Lemoine et al. |
| 5,648,614 A | | 7/1997 | Martsfeld et al. |
| 5,898,388 A | | 4/1999 | Hofmann et al. |
| 5,899,573 A | | 5/1999 | Morita et al. |
| 5,938,346 A | | 8/1999 | Ouchi |
| 6,007,250 A | | 12/1999 | Brauer et al. |
| 6,161,962 A | | 12/2000 | French et al. |

FOREIGN PATENT DOCUMENTS

| EP | 0 594 550 A1 | 4/1994 |
| EP | 0 829 410 A3 | 3/1998 |
| EP | 0 829 410 A2 | 3/1998 |
| GB | 1 604 861 | 12/1981 |
| GB | 2 112 529 A | 7/1983 |
| JP | 5-12744 | 2/1993 |
| JP | 07-260815 A | 10/1995 |
| JP | 8-29441 | 2/1996 |
| JP | 2539382 | 4/1997 |
| JP | 2543369 | 4/1997 |
| JP | 2000-329593 | 11/2000 |
| JP | 2001-151090 | 6/2001 |
| WO | WO 00/51869 A1 | 9/2000 |

OTHER PUBLICATIONS

Patent Abstracts of Japan 06051758 Oct. 13, 1995.

* cited by examiner

*Primary Examiner*—Lenard A. Footland
(74) *Attorney, Agent, or Firm*—Sughrue Mion, PLLC

(57) ABSTRACT

A rolling bearing with sensor includes an inner ring, an outer ring, a plurality of rolling elements disposed between the inner and outer rings, and a sensor having a detecting part detecting a state of the rolling bearing and a circuit part connected to the detecting part. The detecting part and the circuit part are attached to the rolling bearing.

33 Claims, 28 Drawing Sheets

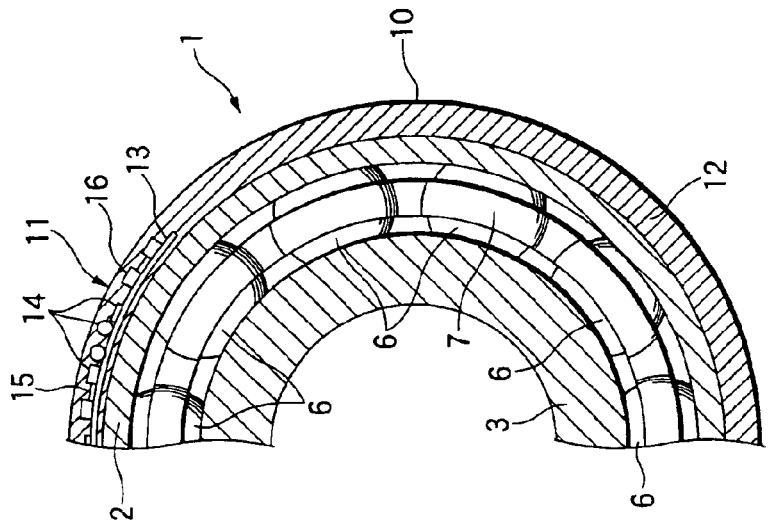
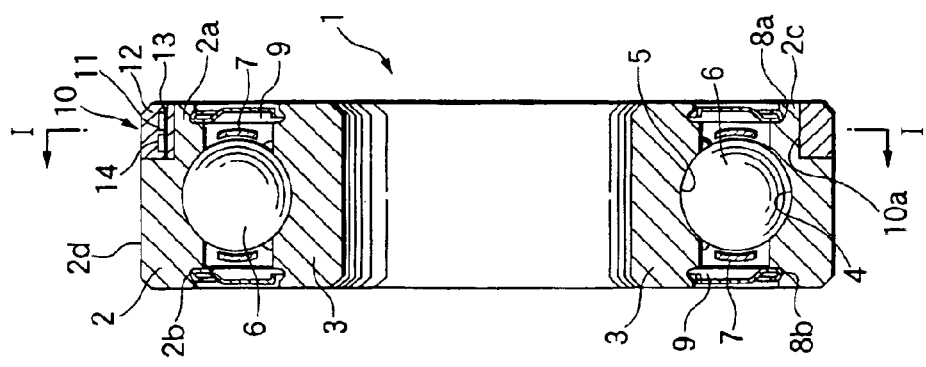

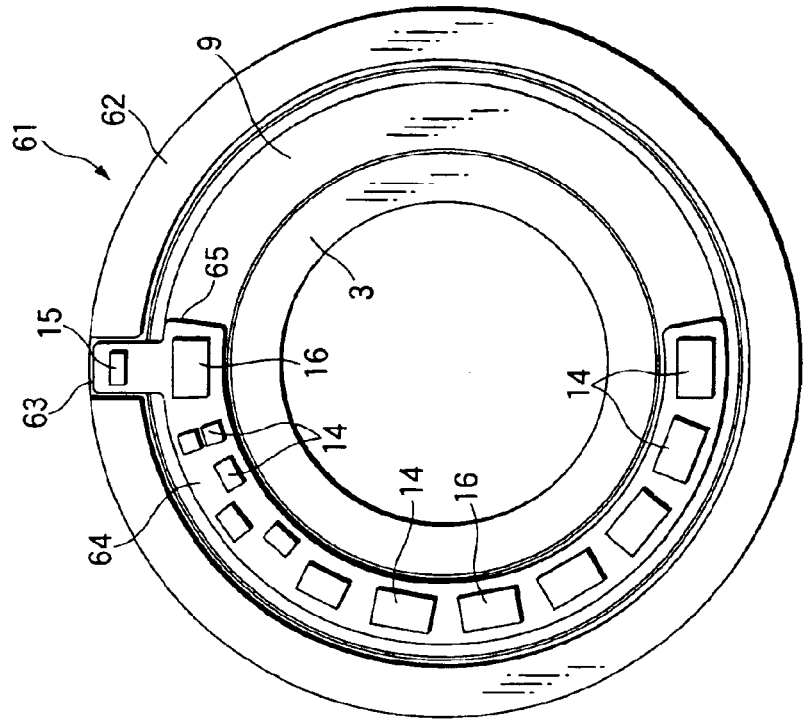

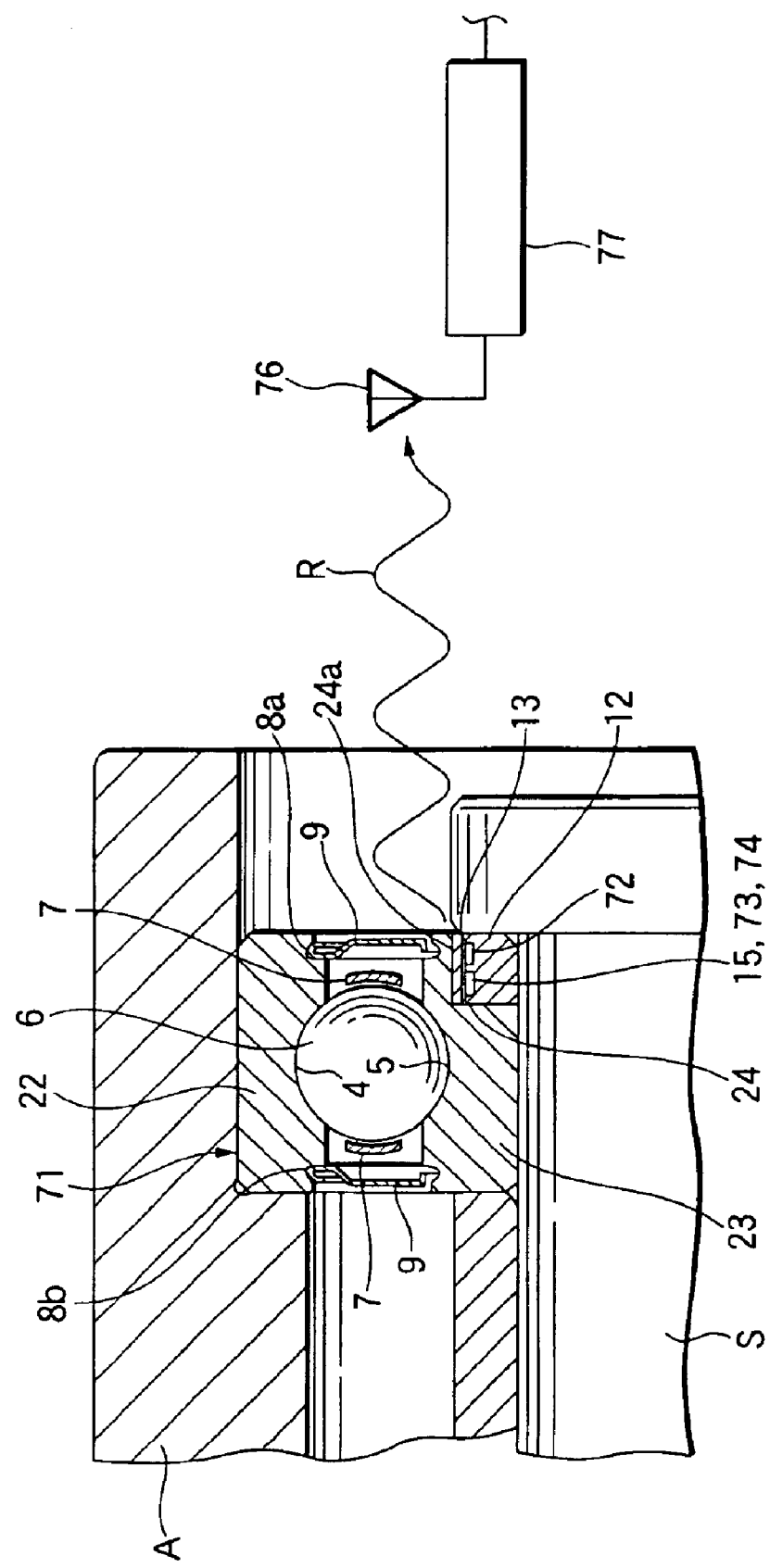

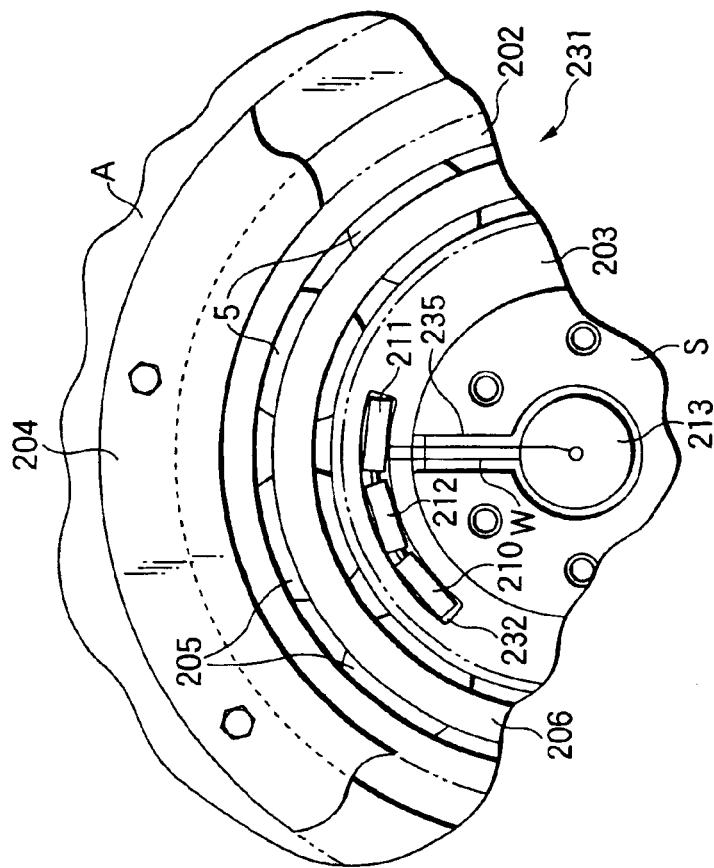
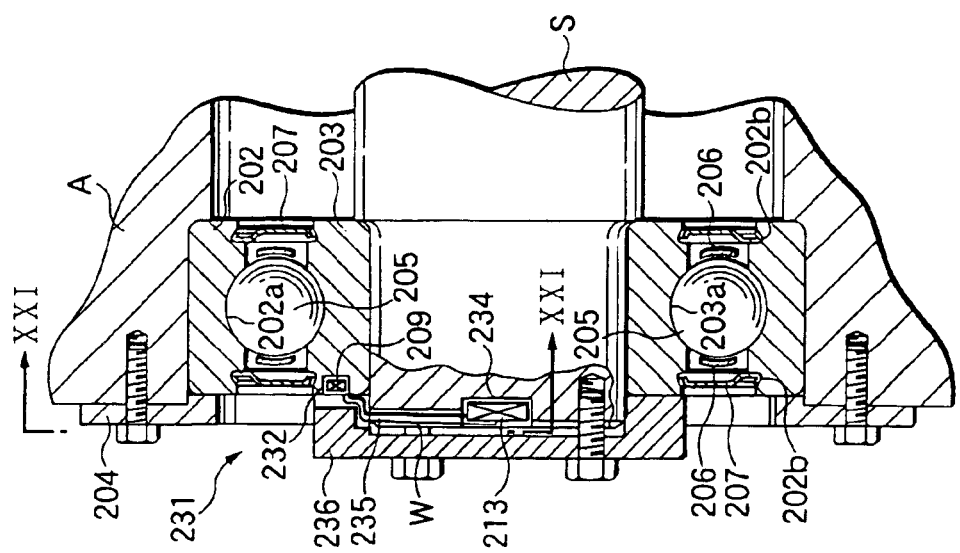

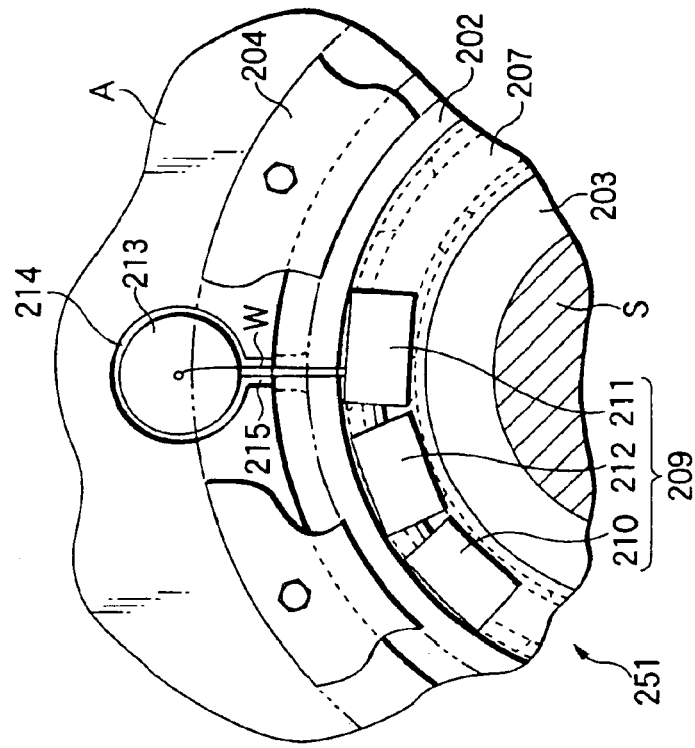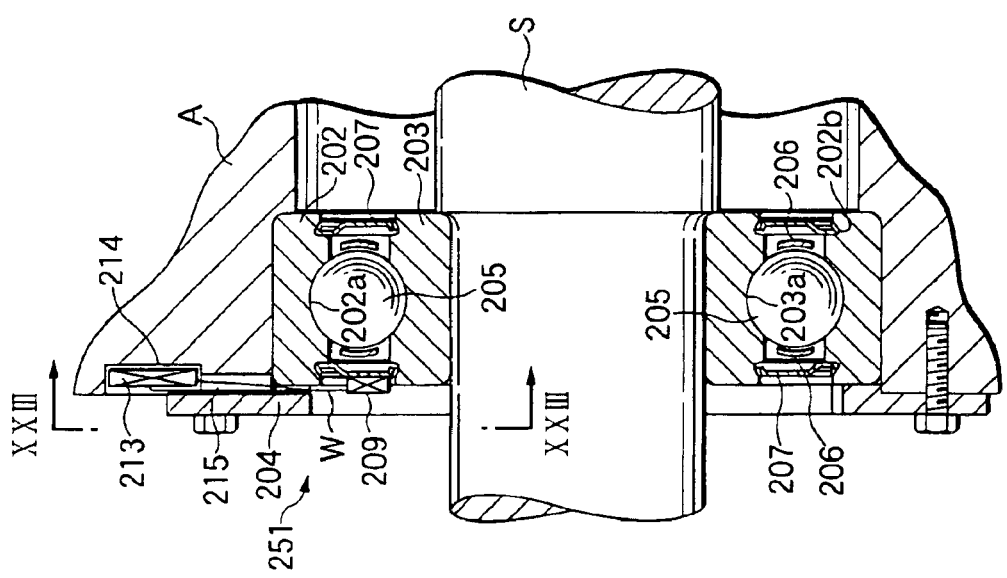

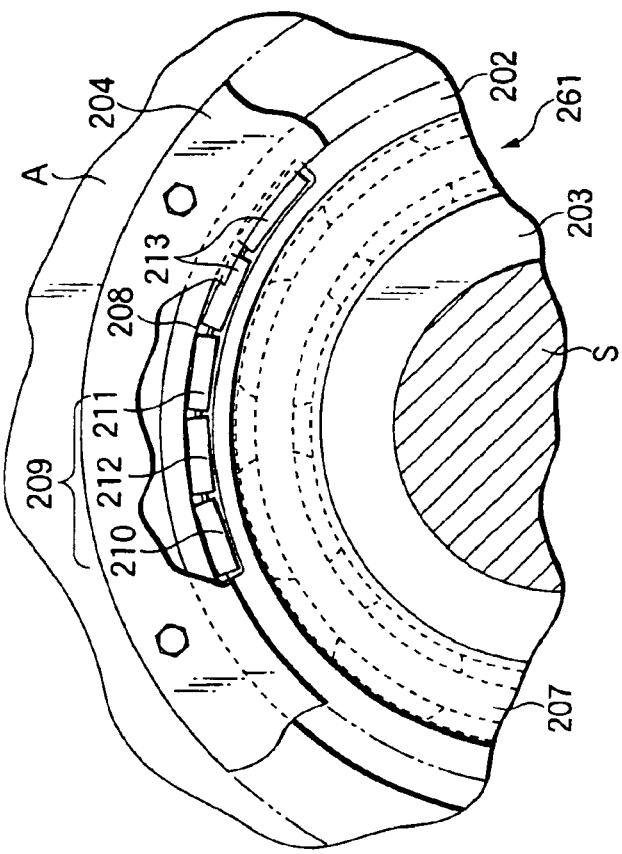
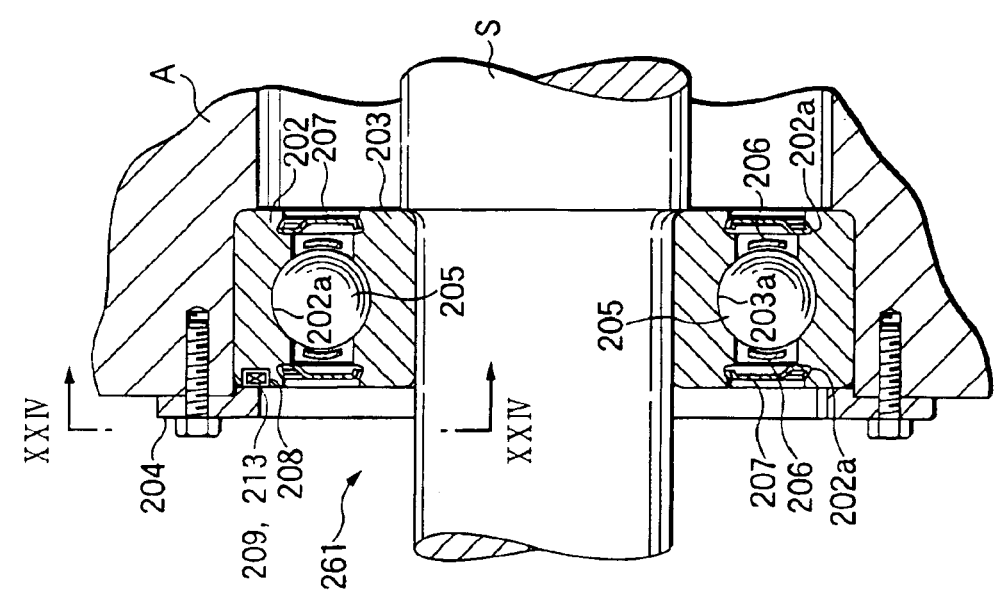

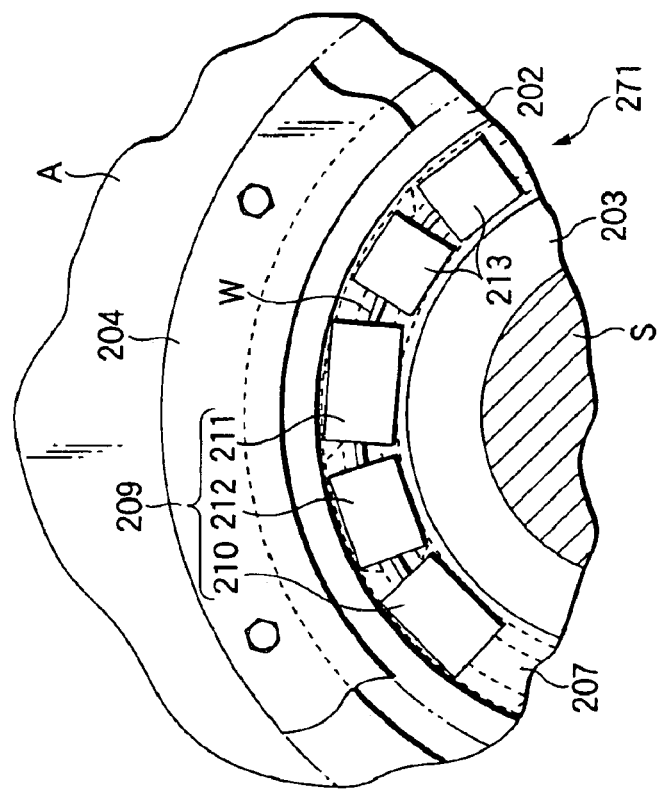
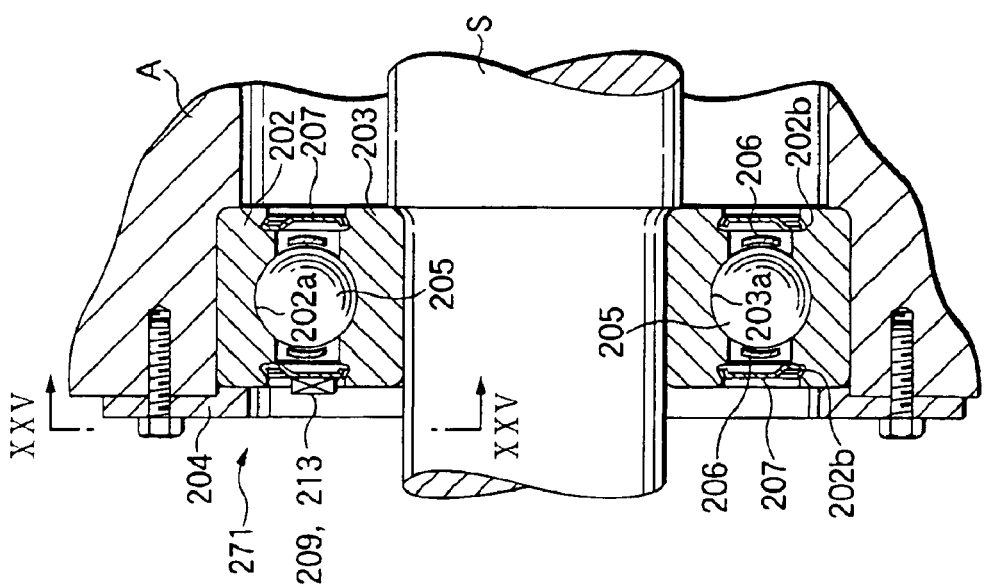
FIG.25B
FIG.25A

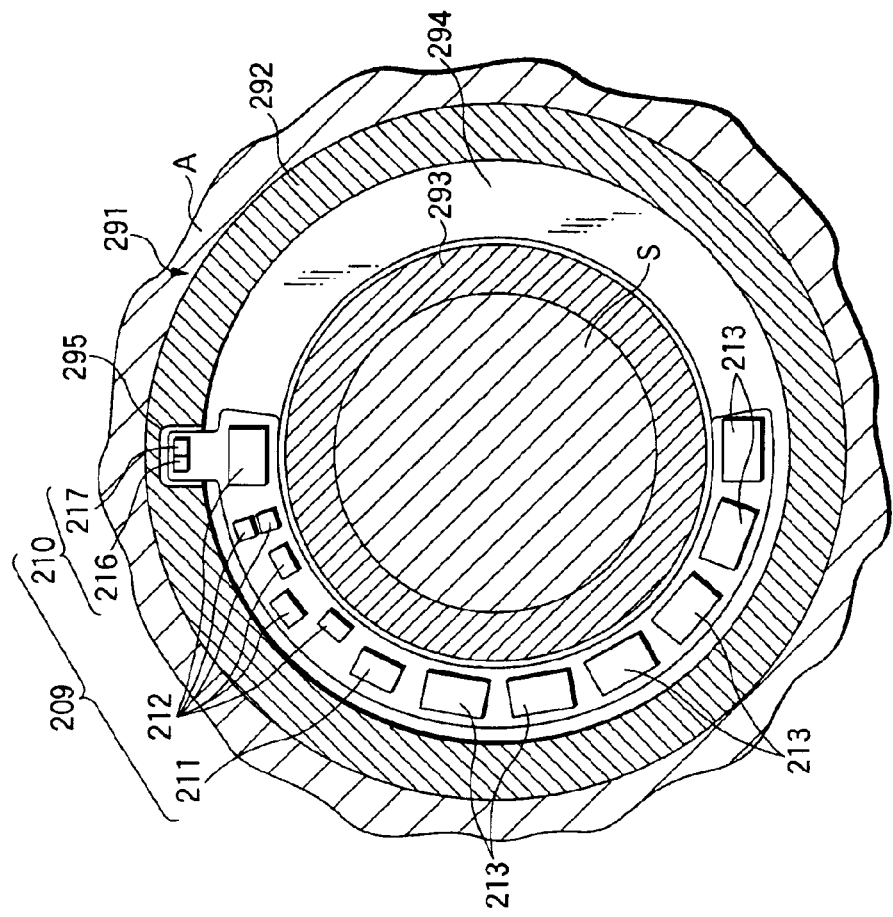
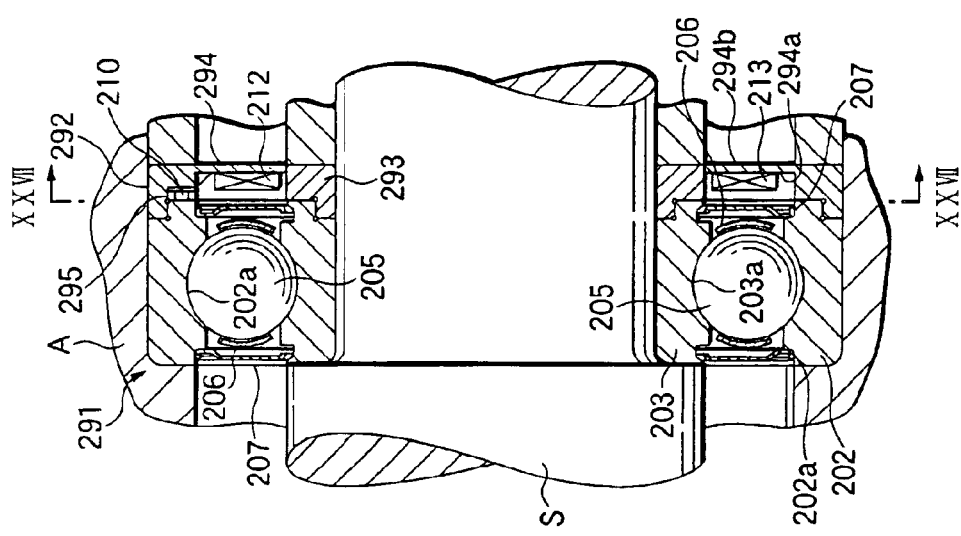

ROLLING BEARING DEVICE AND RING WITH SENSOR FOR THE ROLLING BEARING DEVICE

BACKGROUND OF THE INVENTION

1. Field of the Invention

The present invention relates to a rolling bearing device having a sensor for detecting vibration (acceleration), temperature, rotational speed, humidity (moisture) and the like, and a ring with the sensor for used with the rolling bearing device.

2. Description of the Related Art

The rolling bearings, which are used for reducing rotation resistance, have been used in various fields, such as industrial equipment, vehicles, airplanes, and power plants. The rolling bearing will be vibrated when the rotating shaft is eccentric and be heated through the rotation friction. The vibration and temperature will adversely affect the lifetime of the bearing. In some of industrial machines, a water-soluble cutting lubricant is frequently used in machining work. Accordingly, sometimes the bearing part receives a splash of it, which contains water. When the rolling bearing is mounted on a machine used outdoors, such an automobile, a railroad car, or a construction machine, the bearing is frequently splashed with water when it runs in the rain or on a road with puddles. A measurement which has been taken for preventing the rolling surfaces of the raceway and the rolling elements from rusting is to use water-proof shields made of rubber or the like, which is slidably fitted to the inner and outer rings. Even in the case of the bearing having the water-proof shield, when weather conditions change, in particular when temperature rapidly changes, water enters the inside of the water-proof shield in the form of vapor, so that dew condensation will form on the rolling surfaces of the raceway and the rolling elements, sometimes.

Particularly, in the case of the rolling bearing, which is mounted on a position where its inspection is difficult, e.g., a device interior position, the vibration, temperature, rotational speed or humidity sensors as general-purpose parts are separately provided. A sensor suitable for a rolling bearing to be used is selected from among those sensors, and attached to the outer peripheral surface of the bearing. A signal derived from the sensor thus attached is led out to a necessary part by way of a wire.

Specifically, a general-purpose vibration sensor including an acceleration meter, a general-purpose temperature sensor including a thermocouple, a rotational speed sensor including an encoder and the like are connected, by wires, to an instrument mounted on a housing which accommodates the rolling bearing device. In this case, vibration, temperature and rotational speed of the bearing are indirectly detected through the housing. There is a proposal in which those general-purpose sensors are mounted on the rolling bearing, and signals representative of vibration, temperature and rotational speed are directly detected. In this case, a space used for mounting the sensors is formed in advance in the housing or the shaft.

Threshold values are set for the vibration and temperature. When the measured vibration and temperature exceed the threshold values, signals representative of those measured ones are output to the instrument.

Those general-purpose sensors are large in size. Because of this, a rolling bearing to which the sensors are mounted has a large protruded part at which the sensors are mounted. The protruded part is likely to restrict a freedom in laying out parts. Allowing for this, it is necessary to determine a configuration of the bearing and the layout of the sensors. The wiring ranging from those sensors to the instrument is also required. To mount those bearings with sensor, the machining work of the housing and the shaft increases.

In a case where the existing equipment, e.g., industrial equipment, is automated, it is essential to grasp a running status of the automated equipment in a remote control manner. When changing the bearing in the existing equipment into a bearing with sensor, it is required to greatly alter the bearing and its vicinal structure since the conventional bearing with sensor is not interchangeable with another. Some types of shafts reject the mounting of the sensors thereon. A case where the sensor is not directly attached to the bearing but is located near the sensor, suffers from some problems as described below.

The vibration sensor is constructed mainly with an accelerometer, and its detection has a directivity. Accordingly, when it is located apart from an object to be detected, the detection is likely to contain noticeable noise. In the case of the temperature sensor, with increase of a distance of the sensor to a heat source, its thermal conduction time becomes longer, and the sensing operation is affected by another heat source or sources, resulting in producing an incorrect sensed value. Also for the humidity detecting, it is necessary to detect humidity within the bearing space located inside the bearing; otherwise, it is impossible to correctly evaluate a degree of water entrance.

In addition, to detect a rotational speed of the rotating shaft used in industrial equipment, machine tool, vehicle and the like, an encoder is frequently attached to the shaft. In this case, the encoder is used for a sensor for detecting a rotational speed for the purpose of controlling the rotational speed of the shaft. Further, a sensor for detecting vibration or temperature is provided for monitoring an operating condition of the bearing and the device including the bearing.

The encoder for detecting a rotational speed of the shaft and the sensor for detecting vibration or temperature receive electric power from a power source, which is separately provided. Further, the detected signals of the rotational speed, vibration, temperature and the like are outputted by wires.

In this case, wires must be used for supplying electric power from the separately provided power source to the encoder for detecting a rotational speed of the shaft and the sensor for detecting vibration or temperature. Those wires must be taken out every time the maintenance or replacement of the bearing and its vicinal portion is carried out. A complicated mechanism is required for supplying electric power to the sensor provided on the rotating part.

To avoid this, the power source is preferably incorporated into the bearing. An example of the bearing containing an electric generator therein is disclosed in JP-A-6-200929. The electric generator includes a comb-shaped iron core having a plurality of threads radially arranged from the inner part of the bearing toward the outer part, a coil wound around the bottoms each between the adjacent threads, a plurality of magnets located while being confronted with the bottoms of the iron core, and a ring which has cuts arranged at intervals equal to the threads of the iron core and rotates at a speed equal to that of the bearing between the iron core and the magnets. When the ring rotates between the iron core and the magnets, magnetic lines developed from the magnets are induced into the ring to excite the threads of the iron core, whereby the rotating speed is detected and electric power is generated.

In the electric generator disclosed in JP-A-6-200929, since the iron core extends over a part of the circumference, the electromotive force generated by it is small. Further, the electric power generated by the electromagnetic induction is caused by the magnetic flux. Accordingly, an accuracy of the rotational speed detection will be degraded by ring cutting accuracy, magnet layout accuracy, non-uniformity of magnetic forces of the magnet, dispersion of the gap between the iron core and the ring and dispersion between the ring and the magnet, which is caused by an eccentricity of the ring, and the like. Further, the electric power generated is instable.

SUMMARY OF THE INVENTION

Accordingly, an object of the present invention is to provide a rolling bearing with sensor and a ring with sensor for the rolling bearing device which minimizes the formation of any artificial part on a bearing mounting part of a bearing housing, and which may easily be attached to an equipment that already exists.

Another object of the present invention is to provide a rolling bearing with sensor having a rotational speed sensor which does not need to supply electric power from an external power source, and is capable of detecting a rotational speed at high accuracy.

To attain the above object, there is provided a rolling bearing with sensor having inner and outer ring and rolling elements wherein a sensor in which a detecting part and a circuit part are mounted on a printed circuit board, is provided on and along the inner or outer ring. In a rolling bearing having shields, a detecting circuit part is mounted on a printed circuit board, and the printed circuit board is mounted on the shield. The invention also provides a rolling bearing with sensor comprising: inner and outer rings; rolling elements; a sensor having a detecting part capable of detecting at least one of vibration, temperature, rotational speed or humidity, and a circuit part; and the circuit part being mounted on and along the inner or outer ring. In the rolling bearing, the detecting part for detecting humidity is provided within a space defined by the inner and outer rings and the shield supported by the either of the inner and outer rings.

In the rolling bearing, the circuit part includes a transmitting part which converts a signal output from the detecting part into a radio wave signal, and transmits the converted radio wave signal. Further, it may include an ultrasonic wave generating part which converts a signal detected by the detecting part into an ultrasonic wave signal, and transmits the converted ultrasonic wave signal.

Further, there is provided a rolling bearing with sensor, including; an inner ring; an outer ring; a plurality of rolling elements disposed between the inner and outer rings; a retainer for retaining the rolling elements; a sensor having a detecting part detecting at least one of a rotational speed, a vibration, a temperature and a humidity, a transmitting part transmitting an output of the detecting part or a signal obtained by processing the output, a control part controlling the transmitting part based on the output of the detecting part, and a power source for supplying a power to the detecting part, the transmitting part and the control part; and a receiving device disposed on a position apart from the transmitting part, for receiving the signal transmitted from the transmitting part.

Moreover, there is provided a ring with sensor for a rolling bearing in which a pair of raceway rings rotate relative to each other through rolling elements disposed therebetween, wherein the ring with sensor is disposed so as to rotate together with one of the raceway rings, and the ring with sensor includes: a detecting part detecting at least one of a rotation speed, a vibration, a temperature and a humidity; a transmitting part transmitting an output of the detecting part or a signal obtained by processing the output; a control part controlling the transmitting part based on the output of the detecting part; and a power source for supplying a power to the detecting part, the transmitting part and the control part.

In addition, there is also provided a bearing with sensor including: a plurality of rolling elements; first and second rings rotating relative to each other via the rolling elements; and an electric generator having an annular magnet disposed on the first ring and an annular conductor disposed on the second ring, the electric generator generating electric power by a relative rotation between the magnet and the conductor.

BRIEF DESCRIPTION OF THE DRAWINGS

FIG. 1A is a sectional view showing a rolling bearing with sensor, which is a first embodiment of the invention;

FIG. 1B is a sectional view taken on line I—I in FIG. 1A;

FIG. 6A is a sectional view showing a rolling bearing with sensor, which is a sixth embodiment of the invention;

FIG. 6B is a side view showing the rolling bearing with sensor of FIG. 6A;

FIG. 8 is a sectional view showing a rolling bearing with sensor, which is a seventh embodiment of the invention;

FIG. 21A is a sectional view showing a rolling bearing device, which is a fourteenth embodiment of the invention;

FIG. 21B is a side view taken on line XXI—XXI of FIG. 21A, with a shield and a cover member being omitted;

FIG. 23A is a sectional view showing a rolling bearing device, which is a sixteenth embodiment of the invention;

FIG. 23B is a side view, taken on line XXIII—XXIII of FIG. 23A;

FIG. 24A is a sectional view showing a rolling bearing device, which is a seventeenth embodiment of the invention;

FIG. 24B is a side view, taken on line XXIV—XXIV of FIG. 24A;

FIG. 25A is a sectional view showing a rolling bearing device, which is an eighteenth embodiment of the invention;

FIG. 25B is a side view, taken on line XXV—XXV of FIG.

FIG. 27A is a sectional view showing a rolling bearing device, which is a twentieth embodiment of the invention;

FIG. 27B is a side view, taken on line XXVII—XXVII of FIG. 27A;

DETAILED DESCRIPTION OF THE PREFERRED EMBODIMENTS

Figure 2:
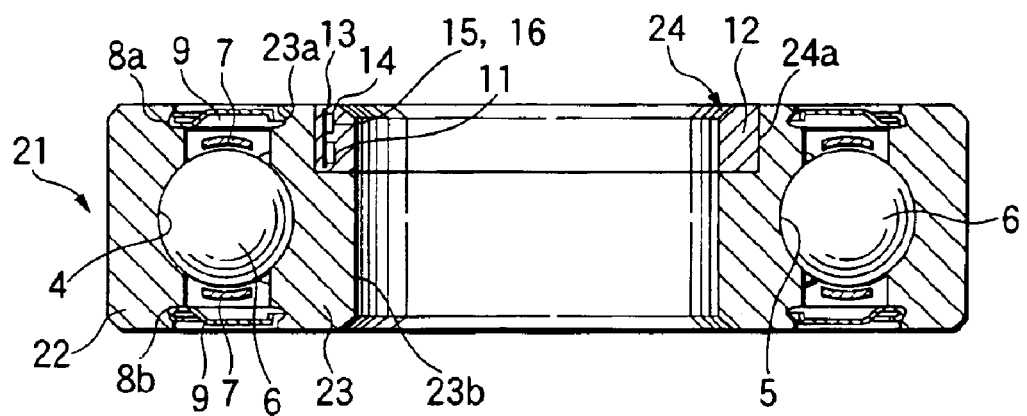
FIG. 2 is a sectional view showing a rolling bearing with sensor, which is a second embodiment of the invention.

A first embodiment of the present invention will be described with reference to FIGS. 1A and 1B. A bearing 1 shown in FIGS. 1A and 1B is a single-row deep groove ball bearing. The bearing 1 includes an outer ring 2 and an inner ring 3, which are examples of a bearing ring. An outer raceway 4, while being recessed, is formed at a central part of the inner peripheral surface of the outer ring 2. An inner raceway 5, while being recessed, is formed at a central part of the outer peripheral surface of the inner ring 3. A plurality of balls 6 as rolling elements are retained with a retainer 7 in the circumferential direction at equal intervals, while being equianguiarly disposed and in rolling contact with the outer raceway 4 and the inner raceway 5. Shield mounting grooves 8a and 8b are respectively provided at the inner peripheral surfaces of both ends 2a and 2b of the outer ring 2 as viewed in the widthwise direction. Shields 9 are fitted to those grooves 8a and 8b.

An annular groove 10, as shown in FIGS. 1A and 1B, is entirely provided on and along one side of the outer periphery edge of the outer ring 2 as viewed from the widthwise direction. A sensor 11 is circumferentially disposed on and along the bottom surface 10a of the annular groove 10 in a state that the sensor 11 is located inside a prolongation of the side face 2c of the outer ring 2, and inside a prolongation of the outer peripheral surface 2d. The sensor 11 is molded by using an insulting material, e.g., a synthetic resin 12. To measure a temperature, it is preferable that a heat conductivity of the synthetic resin 12 is equal to that of a bearing member. The protective synthetic resin 12 for improving the anti-dust, humidity and oil properties of the sensor 11 fills the annular groove 10 and is formed in an annular shape. Its end faces and outer peripheral surface are continuous to and flush with the side face 2c and the peripheral surface 2d.

The sensor 11 for detecting vibration or temperature is constructed such that a detecting part 15 for detecting vibration or temperature and circuit components 14, such as resistors, capacitors and IC, which form and a circuit part 16 for outputting detected signals are mounted on a flexible printed circuit (FPC) board 13.

A second embodiment of the invention will be described with reference to FIG. 2. In the bearing 21 as shown in FIG. 2, an annular groove 24 is formed entirely over the inner peripheral surface of an inner ring 23, viz., the annular groove is not formed in the outer ring 22. A sensor 11 is circumferentially disposed on the bottom surface 24a of the annular groove 24 in a state that the sensor 11 is located inside a prolongation of the side face 23a of the inner ring 23, but outside a prolongation of the inner peripheral surface 23b. The sensor 11 is molded by using an insulating material, e.g., a synthetic resin 12. The protecting synthetic resin 12 fills the annular groove 24, and is annular in shape. Incidentally, the synthetic resin 12 is provided for improving the performances of the dust-proof, water-proof and oil-proof. The end face and the inner peripheral surface of it are flush with the side face 23a and the inner peripheral surface 23b, while being continuous to the latter. To measure a temperature, it is preferable that a heat conductivity of the synthetic resin 12 is equal to that of bearing member.

The remaining portion of the embodiment is substantially the same as the corresponding one in the first embodiment, and hence equivalent portions are designated by like reference numerals and symbols used in the first embodiment, for simplicity of explanation.

As described above, in each of the bearings 1 and 21 of the first and second embodiments mentioned above, the sensor 11 is disposed without outward extension, when comparing with the conventional one. Therefore, there is no need for any special machining of the bearing housing.

Figure 3:
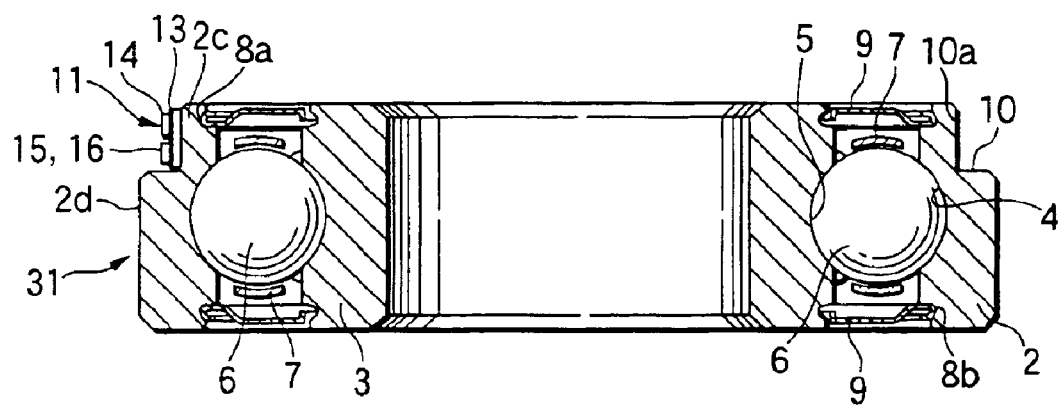
FIG. 3 is a sectional view showing a rolling bearing with sensor, which is a third embodiment of the invention.

A third embodiment of the present invention will be described with reference to FIG. 3. In the bearing 31 shown in FIG. 3, the sensor 11 is directly bonded to a bottom surface 10a of an annular groove 10, which is formed in the outer ring 2. In this case, an FPC (flexible printed circuit board) 13 of the sensor 11 is used as a bonding surface. The remaining portion of the embodiment is substantially the same as the corresponding one in the first embodiment, and hence equivalent portions are designated by like reference numerals and symbols used in the first embodiment, for simplicity of explanation.

Figure 4:
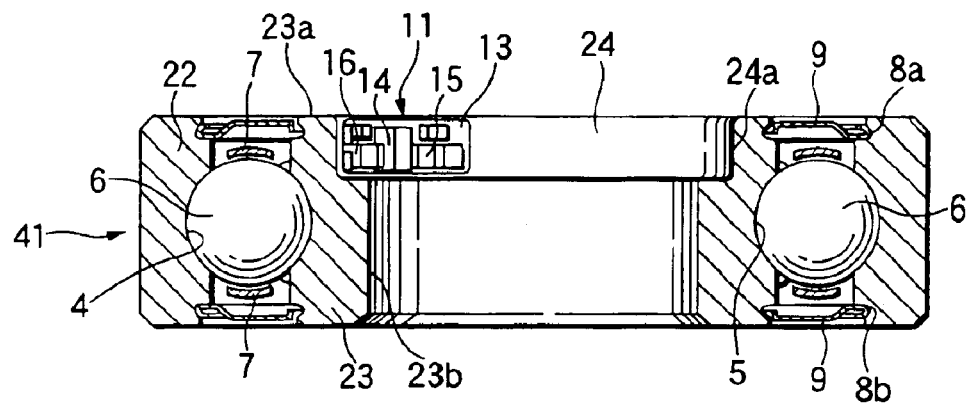
FIG. 4 is a sectional view showing a rolling bearing with sensor, which is a fourth embodiment of the invention.

A fourth embodiment of the invention will be described with reference to FIG. 4. In the bearing 41 shown in FIG. 4, the sensor 11 is directly bonded to a bottom surface 24a of an annular groove 24, which is formed in the inner ring 23. In this case, an FPC 13 of the sensor 11 is used as a bonding surface. The remaining portion of the embodiment is substantially the same as the corresponding one in the second embodiment, and hence equivalent portions are designated by like reference numerals and symbols used in the second embodiment, for simplicity of explanation.

Also in each of the third and fourth embodiments, the sensor 11 is disposed within the annular groove 10 or 24. Accordingly, those embodiments may achieve the object of the present invention as the first and second embodiments do so. It is noted that in the bearing device 31 (41) of the third (fourth) embodiment, the sensor 11 is bonded. This feature brings about the following advantages. Its manufacturing is simpler than in the case where the sensor is molded by using synthetic resin filling the annular groove 10 (24). The manufacturing cost is reduced since the molding resin is not used. Further, the sensor 11 may be additionally used if necessary.

In each of the first to fourth embodiments, a power source for the sensor 11 may be an external power source, and in this case, the external power source is connected to the sensor 11 by a power cable. Otherwise, a power source, together with the sensor 11, maybe located within the annular groove 10 (24), and in this case, there is no need of using the power cable.

Figure 5:
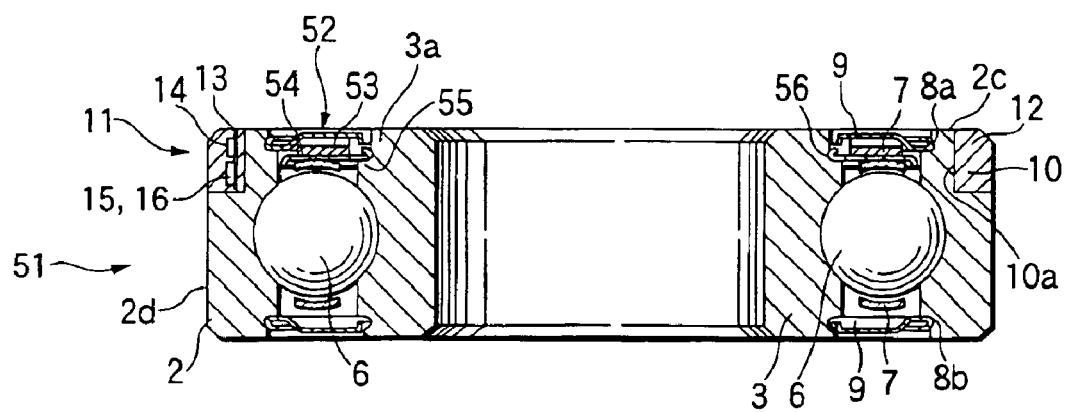
FIG. 5 is a sectional view showing a rolling bearing with sensor, which is a fifth embodiment of the invention.

A fifth embodiment of the invention will be described with reference to FIG. 5. A bearing 51 shown in FIG. 5 includes a surface-opposed generator 52, which is located between the outer ring 2 and the inner ring 3. The surface-opposed generator 52 includes a coil 53 and a magnet 54. A shield 9 is fitted into a groove 8a, which is formed in the inner peripheral surface in an end 2a of the outer ring 2 in the widthwise direction, and corresponds to the location of the annular groove 10. And, the coil 53 is mounted on the inner side (=surface facing balls 6) of the shield 9. The magnet 54 is mounted on a holding plate 55, while being disposed in association with the coil 53. The holding plate 55 is fitted into a holding-plate mounting groove 56, which is formed in the outer peripheral surface of an end 3a of the inner ring 3 in the width direction.

The generator 52 generates electricity and supplies it to the sensor 11. The remaining portion of the embodiment is substantially the same as the corresponding one in the first embodiment, and hence equivalent portions are designated by like reference numerals and symbols used in the first embodiment, for simplicity of explanation.

Where the generator 52 is thus used, it supplies electric power to the sensor 11 even in such a case that it is difficult to supply electric power from an external power source to the sensor 11 or that it is difficult to locate a power source together with the sensor 11, within annular groove 10.

In the fifth embodiment of the invention, the sensor 11 is provided on the outer ring 2 as in the first embodiment. If required, it may be provided on the inner ring 23 as in the second embodiment. In this case, the coil 53 of the generator 52 is mounted on the holding plate 55 that is fitted to the inner ring 23, and the magnet 54 is mounted on the shield 9 that is fitted to the outer ring 22. As in the third and fourth embodiments, the sensor 11 may be bonded for fixation without molding.

Figure 6C:
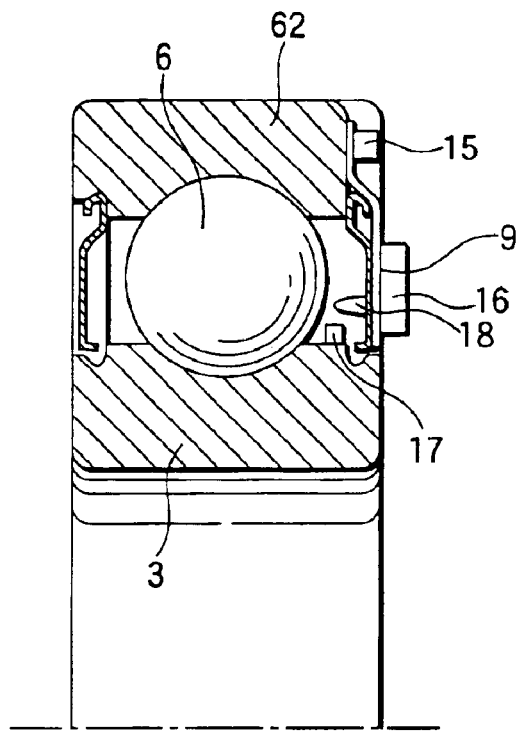
FIG. 6C is a sectional view showing a rotation sensor according to the sixth embodiment of the invention.

A sixth embodiment of the invention will be described with reference to FIGS. 6A, 6B and 6C. A bearing device 61 shown in FIGS. 6A and 6B includes a recessed part 63 formed by cutting a part of the end face of an outer ring 62, which is fitted to the fixed housing A. Also, a rotational speed sensor shown in FIG. 6C includes a rotational speed detecting part 18 and a detected part 17. The detected part 17 is constructed by a permanent magnet attached to an inner ring shoulder portion of a race side with respect to the shield 9, and an outer surface of said permanet megnet is alternately magnetized to have N poles and S poles. The rotational speed detecting part 18 is constructed by a hall element for detecting change of magnetic flux, attached to an inner surface of the shield 9 disposed on the same side as the detected part 17.

The detected part 17 may be made of any one of a plastic magnet, a rubber magnet or a sistered magnet, and further may be made of a gearwheel or a pulser-ring, instead of the permanent magnet. The rotational speed detecting part maybe of an active type such as MR, GMR or hall IC, or of a passive type with a coil. Further, when outer ring rotates, the rotational speed sensor can be structured such that the detected part 17 is attached to the outer ring 62 and the rotational speed detecting part 18 is attached to the inner surface of the shield 9 secured to the inner ring 3.

A detecting part 15 of a sensor 64, which is for detecting a signal representative of vibration, temperature or like of the bearing device 61, is mounted on the recessed part 63. The detecting part 15 is disposed such that it is located inside a prolongation of the side face 62a of the inner ring 62, but outside a prolongation of the outer peripheral surface 62b. The detecting part 15 may be mounted on the recessed part 63 in such a manner that it is molded by using an insulating material, e.g., synthetic resin 12, as in the first and second embodiments or that it is insulatedly bonded to a bottom surface 63a of the recessed part 63 as in the third and fourth embodiments. A circuit part 16 of the sensor 64, while being insulated, is directly bonded to one of shields 9, which are fitted into shield-mounting groove 8a and shield-mounting groove 8b formed respectively in both ends 62c and 62d of the outer ring 62 in the widthwise direction.

The sensor 64 is constructed such that circuit components 14 and the like are mounted on an arcuate FPC 65 formed conforming to a shape of the shield 9. The detecting part 15 and the circuit part 16 are provided on one continuous FPC 65. Otherwise, the detecting part 15 and the circuit part 16 may be mounted on separate FPCs, respectively, and interconnected by wires. A power source may be an external power source connected to the sensor 64 by a power cable. Otherwise, a power source together with the sensor 64 may be located on the shield 9, and in this case, there is no need of using the power cable. Further, a surface-opposed generator 54 as described in the fifth embodiment may be used. The remaining portion of the embodiment is substantially the same as the corresponding one in the first embodiment, and hence equivalent portions are designated by like reference numerals and symbols is used in the first embodiment, for simplicity of explanation.

The mounting part of the sensor 64 is not limited to the above-mentioned one, but in a case where the outer ring serves as a rotating ring and the inner ring serves as a stational ring, a recess formed by cutting a part of the side face 3a of the inner ring 3 may be used for the sensor mounting part. In this case, a shield mounting groove (recess) is formed at the end 3b of the inner ring 3, and the shield is fitted into the groove, and the sensor 64 is mounted thereon.

As described above, the bearing device 61 of the sixth embodiment may be formed by merely cutting a part for mounting the detecting part 15 of the sensor 64. Accordingly, there is no need of machining work of the housing A and the shaft S to which the bearing device 61 is to be mounted, whereby the rolling bearing with sensor 61 requires the least machining work of the bearing.

Figure 7:
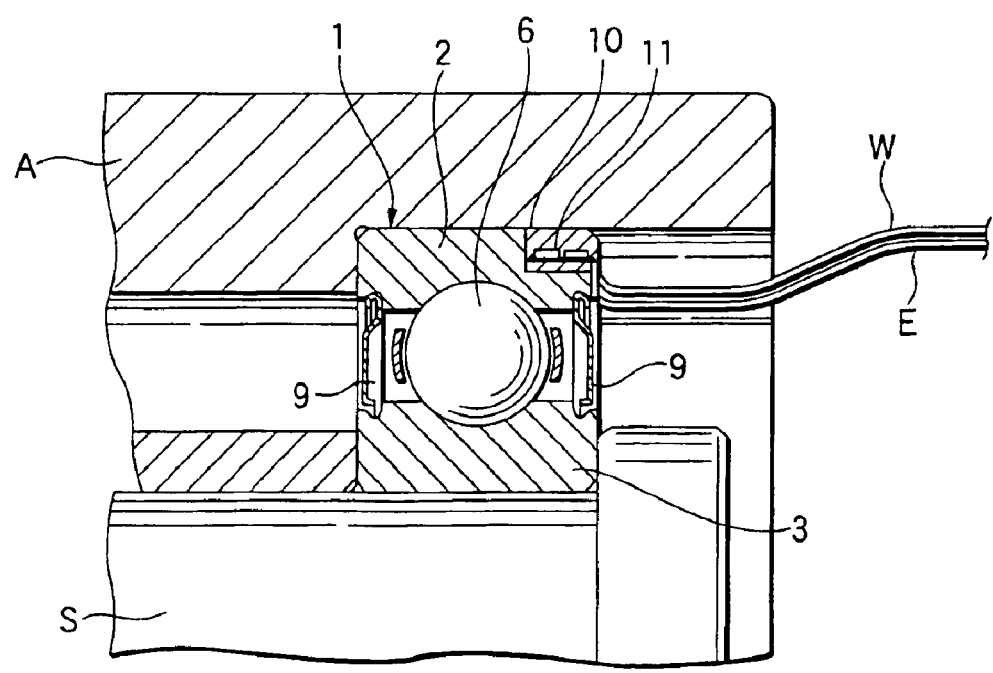
FIG. 7 is a sectional view showing the rolling bearing with sensor of the first embodiment, which is fitted to a housing and to a rotating shaft.

A description will be given of how to take a signal out of the sensor in each of the first to sixth embodiments with reference to FIG. 7. To detect vibration, temperature or the like of the outer ring 2 as a stational ring, a rolling bearing with sensor 1 of the first embodiment is mounted on the housing A as shown in FIG. 7. The housing A is static and at least one of the ends of the housing is opened. The rotating shaft S is inserted through the inner ring 3 of the rolling bearing 1, fixed thereto to be rotatable. A wire W and a power cable E are connected to the sensor 11, which is fastened to the annular groove 10 of the outer ring 2 as the stational ring by molding.

The rolling bearing with sensor 1 may be the bearing 31 of the third embodiment. In a case where the outer ring serves as a rotating ring, and the inner ring serves as a stational ring whose vibration, temperature or the like are detected, the bearing 21 or 41 of the second or fourth embodiment is used and the wire W is connected thereto, so that vibration, temperature or the like of the inner ring 23 may be detected.

In the bearing 61 of the sixth embodiment, the wire W and the power cable E derived from the circuit part 16 of the sensor 64 mounted on the shield 9 are wired along the housing A or the shaft S as a stational part.

As a result, the bearing can output a signal, which is converted by the circuit part 16 of the sensor 11 (64). A power source (not shown) may be located outside by using the wire W and the power cable E as well. When the power source together with the sensor 11 is located in the annular groove 10 (in the sixth embodiment, the sensor 64 is located on the shield 9), or when the surface-opposed generator 52 is provided as in the bearing device 51 of the fifth embodiment, there is no need of using the power cable E to thereby reduce the number of wires extended from the rolling bearing with sensor 1.

A seventh embodiment of the invention will be described with reference to FIGS. 8 through 10. In a rolling bearing with sensor 71 shown in FIG. 8, an outer ring 22 is fitted to a housing A; and a rotating shaft S is fitted into an inner ring 23. The housing A is opened at at least one end thereof. A sensor 72, which is mounted on the rotating ring of the bearing 71, i.e., on an annular groove 24 of an inner ring 23, includes a detecting part 15 for detecting vibration, and a transmitting part (radio wave generator part) 73 which converts a detecting signal into a radio wave R, and transmits it outside. A power source 74 for the sensor 72 is mounted in the annular groove 24.

Figure 9A:
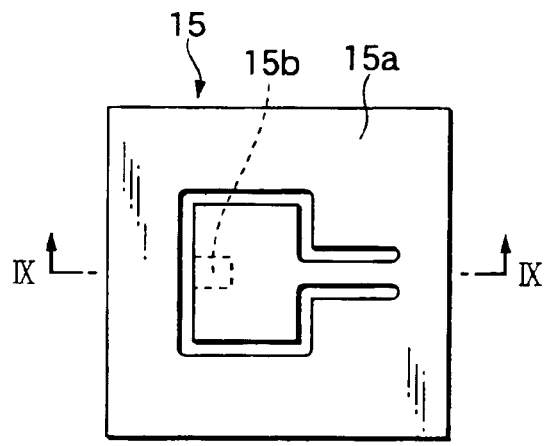
FIG. 9A is a plan view showing a detecting part of a sensor to be mounted on the rolling bearing with sensor shown in FIG. 8.
Figure 9B:
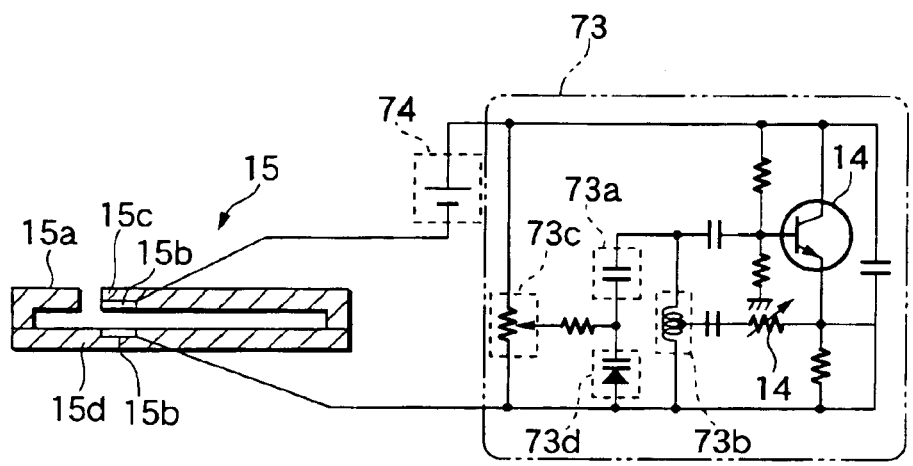
FIG. 9B is a sectional view taken on line IX—IX in FIG. 9A, and a circuit diagram showing a transmitting circuit.

The detecting part 15 includes conductive electrodes 15b mounted on a movable part 15c and a fixed part 15d of a detecting main part 15a made of an elastic insulating material shown in FIG. 9A in such a manner as to oppose to each other. The movable part 15c has an elastic modulus selected so that the conductive electrodes 15b come in contact with each other when it receives a predetermined vibration acceleration. The transmitting part 73, as exemplarily shown in FIG. 9B, includes circuit components 14 such as a capacitor 73a, a coil 73b, a variable resistor 73c, a variable capacitance diode 73d and the like. When the conductive electrodes 15b of the detecting part 15 come in contact with each other under a predetermined vibration acceleration, a current from the power source 74 to the transmitting part 73 is generated, and the current is outputted as a radio wave.

A composite capacitance value C of the capacitor 73a and the variable capacitance diode 73d is varied, when the reverse voltage applied to the variable capacitance diode 73d is varied by varying a resistance value of the variable resistor 73c. And, an oscillation frequency defined by the capacitance value C and a reactance value L of the coil 73b may be selected. In other words, even when a plurality of rolling bearings with sensor 71 are concurrently used, the signals produced from those bearings may be detected discriminately.

Figure 10:
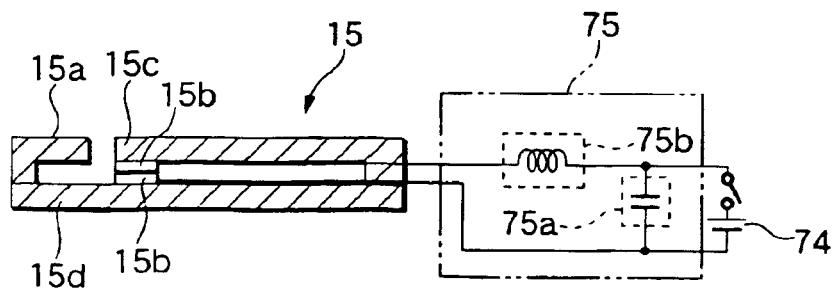
FIG. 10 is a sectional view, similar to FIG. 9B, showing another sensor of the rolling bearing of FIG. 8.

The seventh embodiment may use a transmitting part 75 including a capacitor 75a and a coil 75b as shown in FIG. 10, and the transmitting circuit part 75 is of the fixed frequency type in which a capacitance value of the capacitor 75a and a reactance value of the coil 75b are arbitrarily selected for each rolling bearing 71. Accordingly, the transmitting circuit part 75 can be reduced in size. It is evident that the transmitting parts 73 and 75 are an example of the transmitting part, and those may be realized by other circuit arrangements. The detecting main part 15a may be structured by a thermostat, and then, the sensor emits a radio wave R when a predetermined temperature is detected. If the FPC 13 is configured like the FPC 65 in the sixth embodiment, the sensor 72 includes the transmitting circuit part 73 (75), and is applicable to the bearing 61 of the sixth embodiment. The remaining portion of the embodiment is substantially the same as the corresponding one of the rolling bearing with sensor 21 in the second embodiment, and hence equivalent portions are designated by like reference numerals and symbols used in the second embodiment, for simplicity of explanation.

In the seventh embodiment, although the sensor 72 is molded by using the synthetic resin 12, the sensor 72 may be circumferentially bonded onto and along the bottom surface 24a of the annular groove 24 as in the bearing device 41 of the fourth embodiment. In a case where the outer ring serves as a rotating ring whose vibration, temperature or the like is detected and the inner ring is a stational ring, the sensor 11 of the rolling bearing with sensor 1, 31 or 51 of the first, third or fifth embodiment (the sensor 64 in the bearing device 61 of the sixth embodiment) is substituted by the sensor 72, and, in the rolling bearings with sensor 1 and 31, a power source is located in the annular groove 10 (on the shield 9 in the sixth embodiment). By so doing, a detecting signal may be transmitted while being carried on a radio wave R. The transmitted signal is received by an antenna 76 located at a remote position, and transmitted through a demodulator 77 to a related control system.

Since the rolling bearing 71 of the seventh embodiment transmits a detected signal as a radio wave R, there is eliminated the wires extended from the rolling bearing 71. Accordingly, vibration, temperature or the like of the rolling bearing may be detected in such a simple manner that the rolling bearing is mounted as in mounting the conventional one. The rolling bearing with sensor 71 of the embodiment may be used for detecting vibration, temperature or the like of the stational ring as well as those of the rotating ring.

Figure 11:
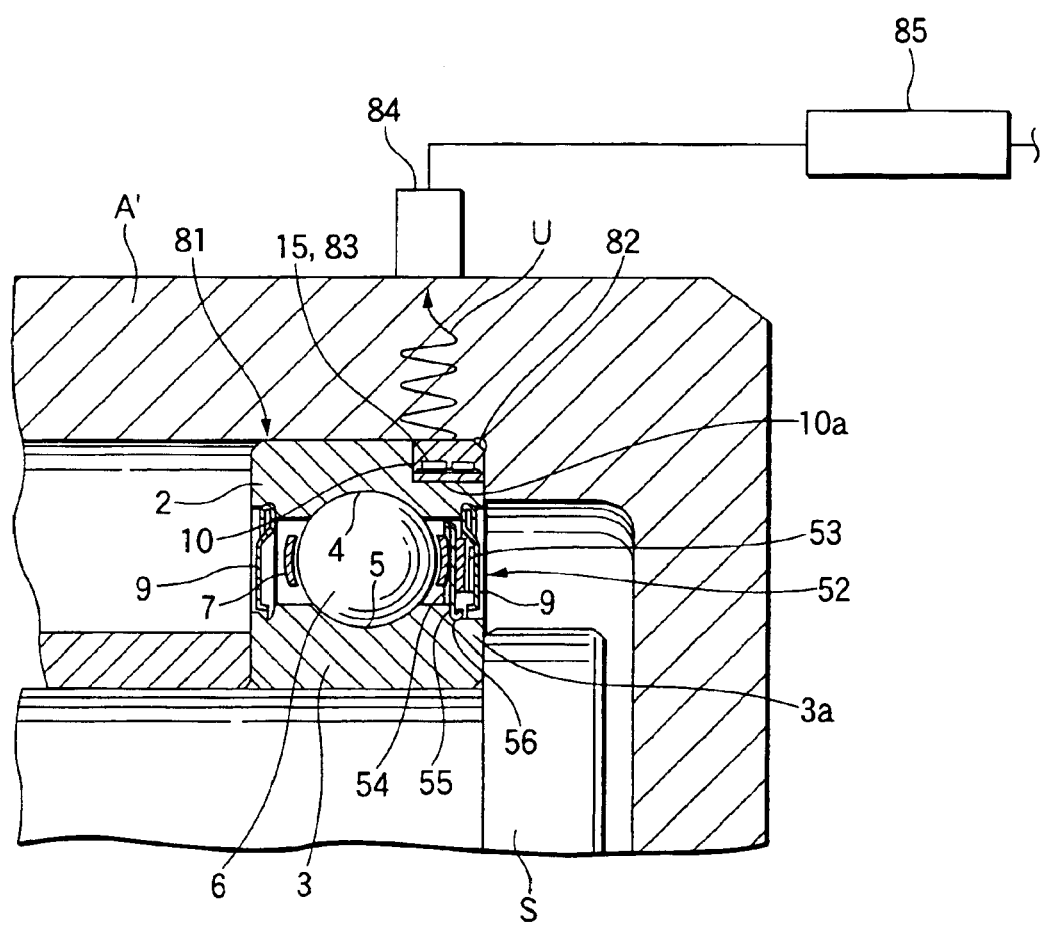
FIG. 11 is a sectional view showing a rolling bearing with sensor, which is an eighth embodiment of the invention.
Figure 12A:
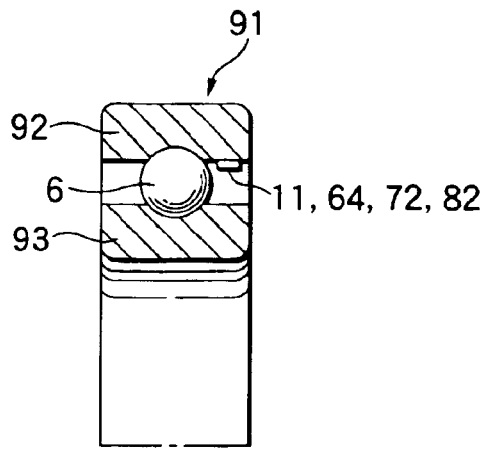
FIGS. 12A to 12F are sectional views showing various types of rolling bearings with sensor, each constituting a ninth embodiment of the invention.
Figure 12B:
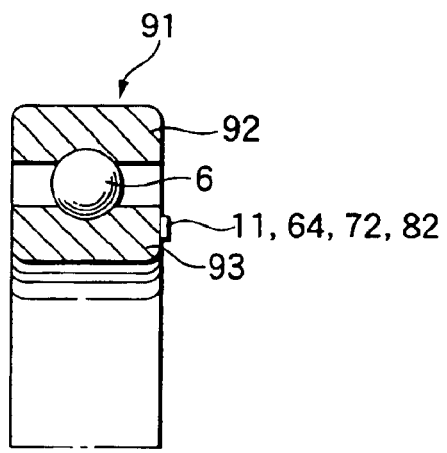
Figure 12C:
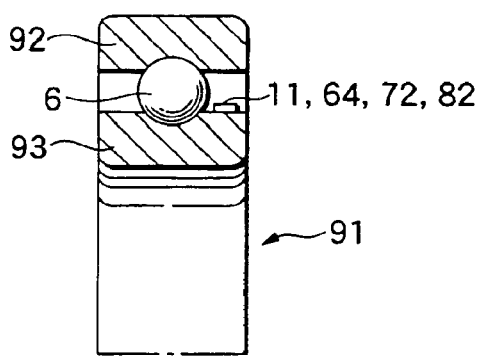
Figure 12D:
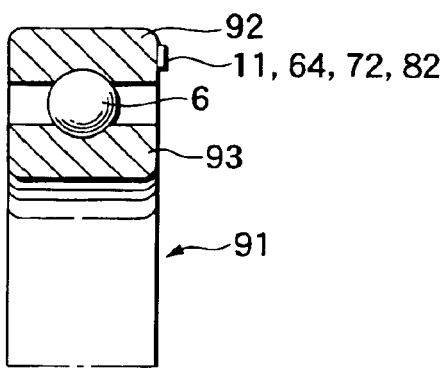
Figure 12E:
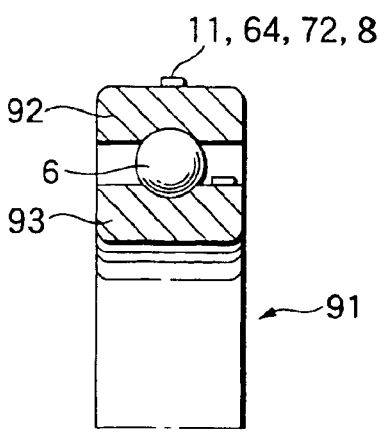
Figure 12F:
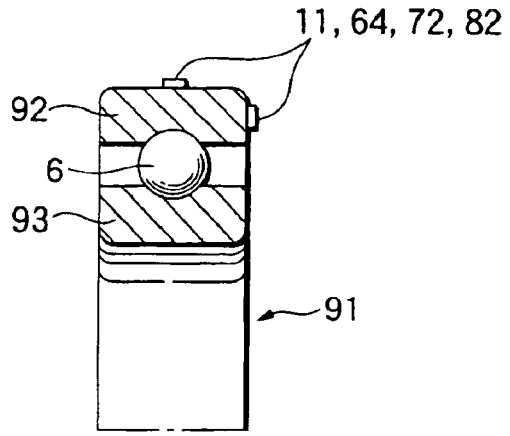

An eighth embodiment of the invention will be described with reference to FIG. 11. A bearing device 81 shown in FIG. 11 includes an outer ring 2 fitted to the inner surface of a housing A' tightly closed and an inner ring 3 fitted into a rotating shaft S. An annular groove 10 is formed in the outer ring 2. A sensor 82 is circumferentially fastened to the bottom surface 10a of the annular groove 10 by molding. The sensor 82 includes a detecting part 15 for detecting vibration, temperature or the like, and an ultrasonic wave output circuit part (ultrasonic wave generating part) 83 which converts a detecting signal into an ultrasonic wave signal U and outputs the converted one. If the FPC 13 is configured like the FPC 65 in the sixth embodiment, the sensor 82 can include the ultrasonic wave output circuit part 83 applicable to the bearing 61 of the sixth embodiment. The remaining portion of the embodiment is substantially the same as the corresponding one of the bearing 51 of the fifth embodiment, and hence equivalent portions are designated by like reference numerals and symbols used in the fifth embodiment, for simplicity of explanation.

In the eighth embodiment, the sensor 82 and a power source (not shown) may be put in the annular groove 10, instead of the generator 52. In a case where the outer ring serves as a rotating ring, and the inner ring serves as a stational ring being an object to be detected, viz., its vibration, temperature or the like are detected, the rolling bearing with sensor 21 of the second embodiment is used for the bearing 81, the sensor 11 of the rolling bearing 21 is used for the sensor 82, or a power source is put in the annular groove 24 or a surface-opposed generator 52 is used as in the fifth embodiment. By so doing, detected signals representative of vibration, temperature or the like may be sent in the form of an ultrasonic wave U. The ultrasonic wave signal U is received by an ultrasonic wave receiver 84. In this case, the ultrasonic wave receiver 84 is detachably mounted in a closed manner on an ultrasonic wave detecting surface provided on the outer surface of the housing A'. The received ultrasonic wave signal is transmitted to a related control system, by way of a demodulator 85.

Thus, in the rolling bearing with sensor 81 of the eighth embodiment, the sensor 82 can output detecting signals representative of vibration, temperature or the like in the form of the ultrasonic wave signals U even when the bearing device 81 is covered with the housing A'.

In the sensors 11, 72 and 82 of the first to fifth, seventh and eighth embodiments are fastened to the bottom surfaces 10a and 24a of the annular grooves 10 and 24 by bonding or molding. In the sensor 64 of the sixth embodiment, the detecting part 15 is fastened to the raceway by molding or bonding, and the circuit part 16 is mounted on the shield 9. In either case, the detecting part 15 is mounted at a position inside an area surrounded by the prolongation of the end faces of the outer ring and the inner ring, a prolongation of the outer peripheral surface of the outer ring, and a prolongation of the inner peripheral surface of the inner rings Therefore, there is no need for any special machining of the housing.

A ninth embodiment of the invention will be described with reference to FIGS. 12A to 12F. In rolling bearings with sensor 91 shown in FIGS. 12A to 12F, sensors 11, 64, 72 and 82 are directly bonded to the surfaces of the outer ring 92 and the inner ring 93, by using FPCs 13 and 65 as bonding surfaces. For the details of the sensors, reference is made to the first embodiment for the sensor 11, the sixth embodiment for the sensor 64, the seventh embodiment for the sensor 72, and the eighth embodiment for the sensor 82. The rolling bearing with sensor 91 of this embodiment requires a less machining work of the housing when comparing with the conventional one.

A tenth embodiment of the invention will be described with reference to FIGS. 13A through 15. In the embodiment, like reference numerals and symbols will be used for designating like or equivalent portions in the first to ninth embodiments.

Figure 13A:
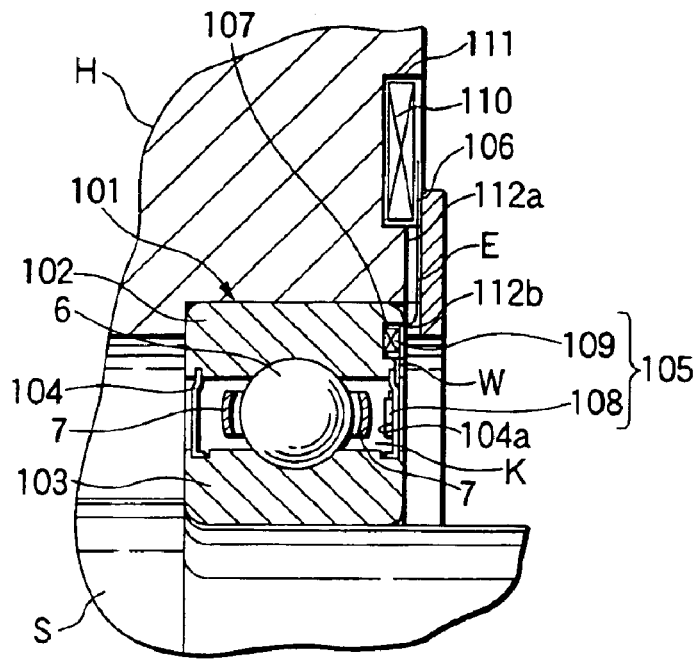
FIG. 13A is a sectional view showing a rolling bearing with sensor, which is a tenth embodiment of the invention.
Figure 13B:
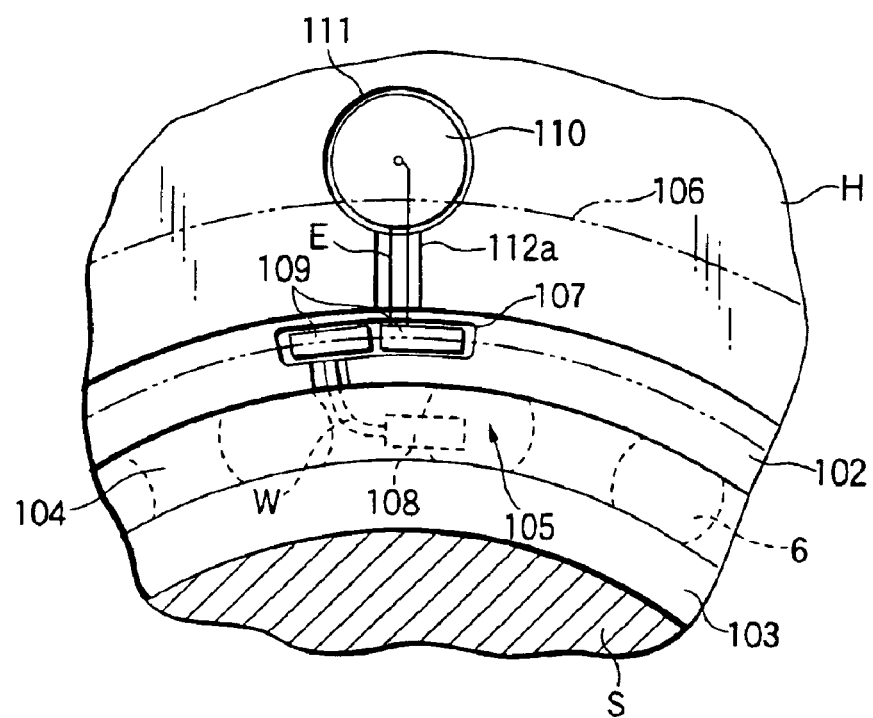
FIG. 13B is a side view showing the rolling bearing with sensor shown in FIG. 13A.

A rolling bearing with sensor 101 shown in FIG. 13A includes an outer ring 102, an inner ring 103, and a sensor 105 for sensing a humidity in a space K surrounded preferably by water-proof shields 104. In the rolling bearing 101, the outer ring 102 is fitted into the opened end of a housing A and fastened by a fixing ring 106. The inner ring 103 is fitted to the outer peripheral surface of the rotating shaft S. A recess 107, as shown in FIG. 13B, is formed in a part of the end face of the outer ring 102, while extending in the circumferential direction.

The sensor 105 includes a detecting part 108 and a circuit part 109, and receives electric power from a power source (e.g., a button shaped battery) 110 by way of a power cable E. The water-proof rubber shields 104 is fitted to the outer ring 102 and is slidably contacted with the inner ring 103, and the detecting part 108 is mounted on the inner surfaces 104a of the water-proof shields 104, viz. Within a space K surrounded by the outer ring 102, the inner ring 103 and the water-proof shields 104. The circuit part 109 is disposed so that it is not protruded out of a recess 107 formed in the outer ring 102. The recess 107 to which the circuit part 109 has been mounted may be molded by using synthetic resin. The circuit part 109 may be mounted on an FPC, as in the sensors 11, 64, 72 and 82 in the first to ninth embodiments. Fabricating of the circuit part into an integrated circuit is more preferable since remarkable size reduction of it is realized.

The electric power 110 is placed in a recess 111 formed at apart of the housing A in insulating and water-tight fashion. Grooves 112a and 112b for receiving the power cable E, are formed in the housing A and the fixing ring 106, while ranging from the recess 107 to the recess 111.

Figure 14:
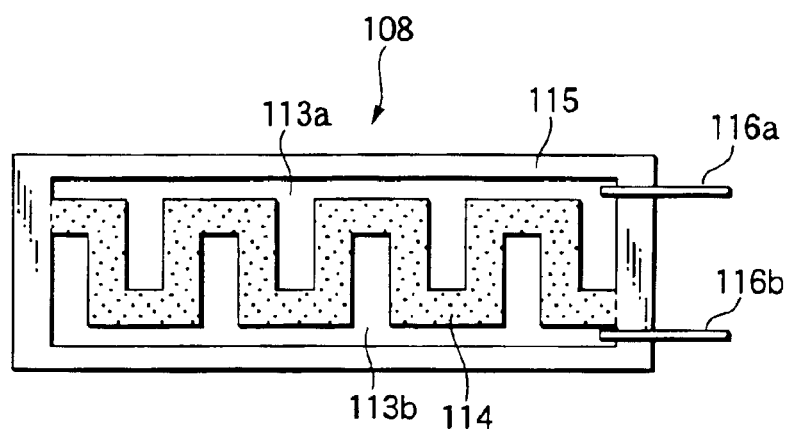
FIG. 14 is an enlarged diagram showing a detecting part of a humidity-detecting sensor shown in FIGS. 13A and 13B.

The detecting part 108 of the sensor 105 includes two electrodes 113a and 113b formed in a comb shape, and a moisture-absorbing conductor 114 located between those electrodes 113a and 113b as shown in FIG. 14. The two electrodes 113a and 113b and the conductor 114 are mounted on an insulating substrate 115. Terminals 116a and 116b are mounted on the electrodes 113a and 113b, respectively. The moisture-absorbing conductor 114 is formed with a thin film made of porous ceramics, e.g., calcium phosphate, by coating sintering and drying process or vacuum deposition process. When the conductor 114 absorbs atmospheric moisture, electric resistance value between the two electrodes 113a and 113b varies. A variation of the electric resistance value in the detecting part 108 is detected in the form of a signal of a variation of humidity. To this end, a fixed voltage Vcc is applied to the electrode 113a of the detecting part 108, and a resistor "r" earthed is connected to the electrode 113b. A voltage V1 passing through the detecting part 108 is detected as a signal proportional to the humidity.

Figure 15:
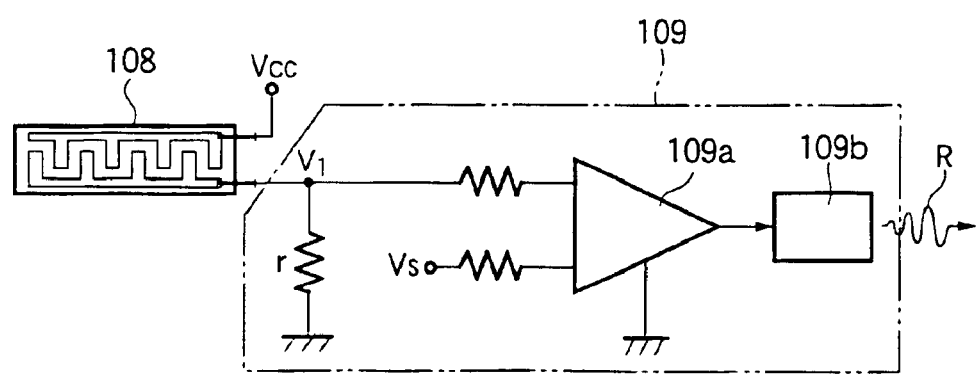
FIG. 15 is a block diagram showing the humidity-detecting sensor of FIG. 13.

The circuit part 109 shown in FIG. 15 includes a comparator circuit 109a for processing a signal derived from the detecting part 108, and a transmitting part 109b for generating a radio wave. A voltage V1 derived from the detecting part 108 is input to the comparator circuit 109a as an object voltage for comparison. Further, a reference voltage Vs is applied to the comparator circuit part 109a. When the detecting part 108 absorbs atmospheric moisture and the moisture-absorbing conductor 114 of the detecting part 108 reduces its resistance value, the voltage V1 is relatively increased. The comparator circuit compares a threshold value defined by the reference voltage Vs with the voltage V1 whose value varies in accordance with a degree of moisture absorption by the detecting part 108. When the voltage varies to exceed the threshold value, the comparator circuit 109a outputs a signal to the transmitting circuit part 109b. Accordingly, the sensor 105 transmits a radio wave when the detected humidity exceeds the predetermined threshold value. The threshold value may be adjusted by changing the resistor "r", the reference voltage Vs and the like. Thus, the circuit part 109 operates such that a signal output from the detecting part 108 is compared with the threshold value, and a radio wave R is transmitted to a receiver (not shown) located outside on the basis of the comparison result. It is evident that the circuit arrangement of the circuit part 109 is not limited to that shown in FIG. 15.

As described above, the tenth embodiment thus constructed is capable of detecting a humidity in the space surrounded by the outer ring 102, the inner ring 103 and the water-proof shields 104 of the rolling bearing with sensor 101. In the rolling bearing with sensor 101, the special machining work of the bearing mounting part, e.g., the bearing housing A, may be minimized, and the rolling bearing with sensor may readily be mounted on the existing equipment.

An eleventh embodiment of the present invention will be described with reference to FIGS. 16A and 16B. Like reference numerals and symbols will be used for designating equivalent portions in the first to tenth embodiments.

Figure 16A:
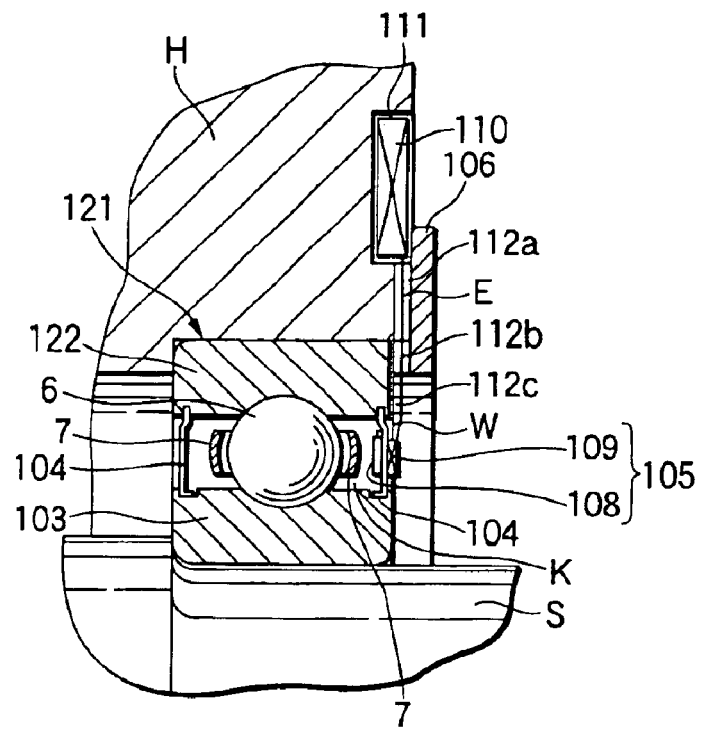
FIG. 16A is a sectional view showing a rolling bearing with sensor, which is an eleventh embodiment of the invention.
Figure 16B:
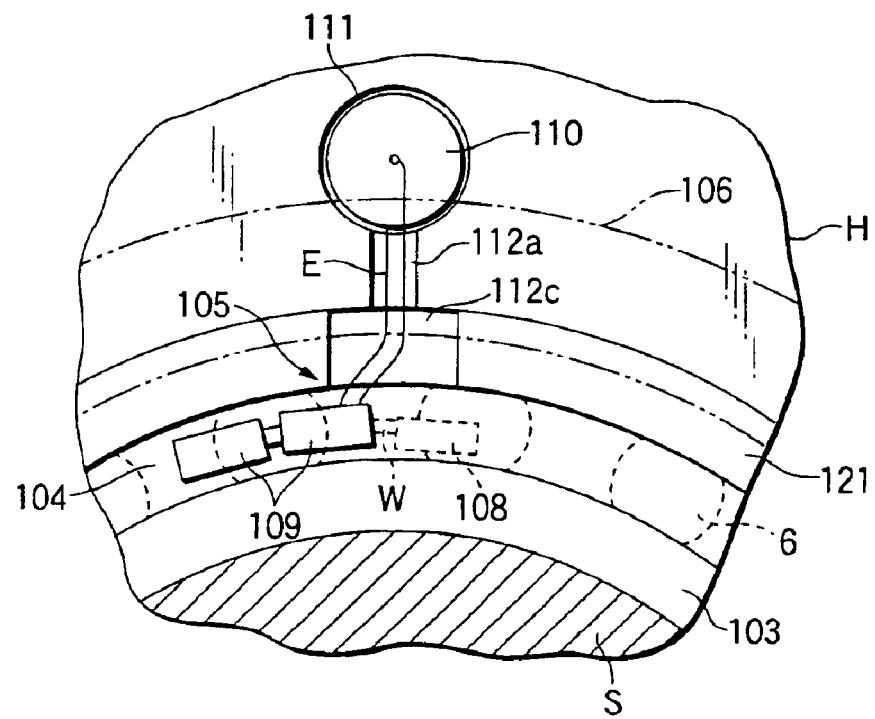
FIG. 16B is a side view showing the rolling bearing with sensor shown in FIG. 16A.

In a rolling bearing with sensor 121 shown in FIG. 16A, an outer ring 122 is fitted into the end of the housing A, and an inner ring 103 is fitted to the outer peripheral surface of the rotating shaft S. The bearing 121 includes a sensor 105 for detecting a humidity. The circuit part 109 of the sensor 105 is mounted on an outer surface 104b of the water-proof shield 104, viz., a surface opposite to the inner surface 104a to which the detecting part 108 is mounted. As shown in FIG. 16B, a circuit part 109 includes a comparator circuit 109a for comparing a signal output from a detecting part 108 with a predetermined threshold value, and a transmitting circuit part 109b for transmitting a radio wave in response to a signal output from the comparator circuit 109a. The circuit part is mounted on the water-proof shields 104 along the circumferential direction thereof. The detecting part 108 and the circuit part 109 of the sensor 105 are interconnected by a wire W, which passes through the water-proof shields 104 in a watertight manner. The circuit part 109 may be mounted on an FPC, as in the sensors 11, 64, 72 and 82 in the first to ninth embodiments, or fabricated into an integrated circuit for further remarkable size reduction.

Electric power of the sensor 105 is supplied from the power source 110 placed in the recess 111 of the housing A through the power cable E. To arrange the power cable E in the range from the power cable E to the circuit part 109, the grooves 112a and 112b are formed in the housing A and the fixing ring 106, and a stepped part 112c is formed at a part of the outer ring 122. If the power cable E does not interfere with the fixing ring 106, the stepped part 112c of the outer ring 122 may be omitted, and hence no machining work is required for the outer ring 122.

Thus, the eleventh embodiment is capable of detecting the humidity in the within a space K surrounded by the outer ring 122, the inner ring 103 and the water-proof shields 104 of the bearing 121. In this rolling bearing with sensor, the special machining work of the bearing mounting part, e.g., the bearing housing A, may be minimized, and the rolling bearing with sensor may readily be mounted on the existing equipment. Further, since the detecting part 108 and the circuit part 109 of the sensor 105 are both mounted on the water-proof shield 104, the assembling of the bearing 121 is easy.

A twelfth embodiment of the invention will be described with reference to FIGS. 17A and 17B. Like reference numerals and symbols will be used for designating equivalent portions in the first to eleventh embodiments.

Figure 17A:
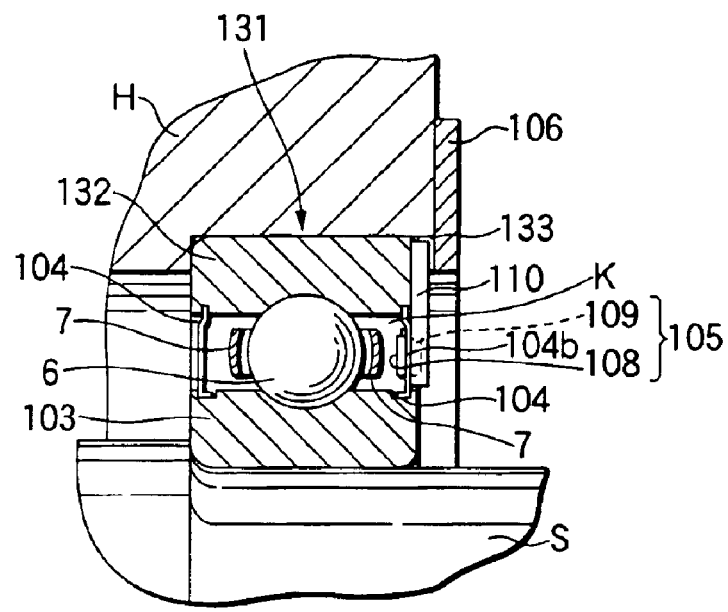
FIG. 17A is a sectional view showing a rolling bearing with sensor, which is a twelfth embodiment of the invention.
Figure 17B:
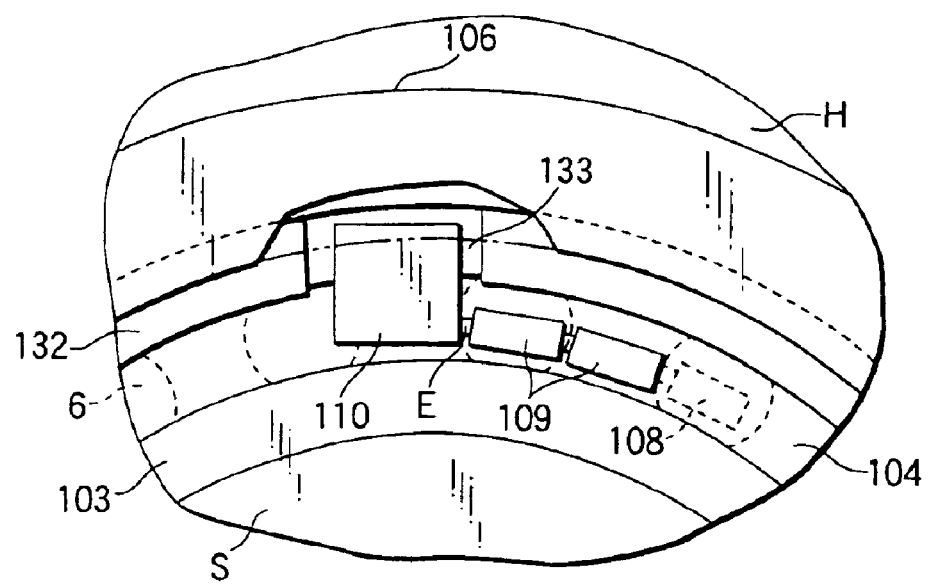
FIG. 17B is a side view showing the rolling bearing with sensor shown in FIG. 17A.

A rolling bearing with sensor 131 shown in FIG. 17A includes a sensor 105 for detecting the humidity, as in the tenth and eleventh embodiments. The circuit part 109 of the sensor 105, as shown in FIG. 17B, is mounted on the water-proof shield 104 as in the eleventh embodiment. The circuit part 109 may be mounted on an FPC, as in the sensors 11, 64, 72 and 82 in the first to ninth embodiments. Further, the circuit part may be fabricated into an integrated circuit for size reduction.

The power source 110 is a solar battery. At a part of the raceway ring (an outer ring 132 in this case) to which the water-proof shields 104 are fastened, a stepped part 133 is formed to be flush with the outer surface 104b of the water-proof shields 104. The power source 110 of the solar battery is mounted over an area including the stepped part 133 and the water-proof shield 104. If the solar battery is configured along the circumferential direction of the water-proof shield 104, there is no need of forming the stepped part 133 of the outer ring 132.

As described above, the twelfth embodiment is capable of detecting the humidity within a space K surrounded by the outer ring 132, the inner ring 103 and the water-proof shields 104 of the bearing 131. In this rolling bearing with sensor, the special machining work of the bearing mounting part, e.g., the bearing housing A, may be minimized, and the rolling bearing with sensor may readily be mounted on the existing equipment. Since the solar battery is used for the power source 110, no care must be taken of the occurrence of a worn battery.

In the tenth to twelfth embodiments, the detecting part 108 of the sensor 105 is located outside the space K defined by the outer ring 102 (122, 132), the inner ring 103, and the water-proof shields 104. The detecting part 108 may be located within the space K as in the cases of FIGS. 12A and 12C in the ninth embodiment, if the size of it allows such doing of the detecting part. Specifically, it may be located on the inner peripheral surface of the outer ring 102 (122, 132) facing the space K or the outer peripheral surface of the inner ring 103 facing the space K. The detecting part 108 may be constructed so as to detect vibration, temperature or humidity.

In the respective embodiments, the single-row deep groove ball bearing is used for the rolling bearing. It will readily be understood that also when the invention is applied to other types of rolling bearings, such as a cylindrical roller bearing or a thrust ball bearing.

As seen from the foregoing description, in the rolling bearing with sensor of the invention, the special machining work of the bearing mounting part, e.g., the bearing housing, is minimized, and the rolling bearing with sensor may readily be mounted on the existing equipment. In the invention, the sensor is mounted on the bearing whose vibration, temperature, humidity or the like is detected. Therefore, vibration, temperature, humidity or the like may be detected quickly and accurately.

Further, the sensor includes the radio wave generating part or an ultrasonic wave generating part. The bearing assembling work is free from troublesome work of wiring or the like. Accordingly, the invention provides an easy-to-handle rolling bearing with sensor.

Figure 18:
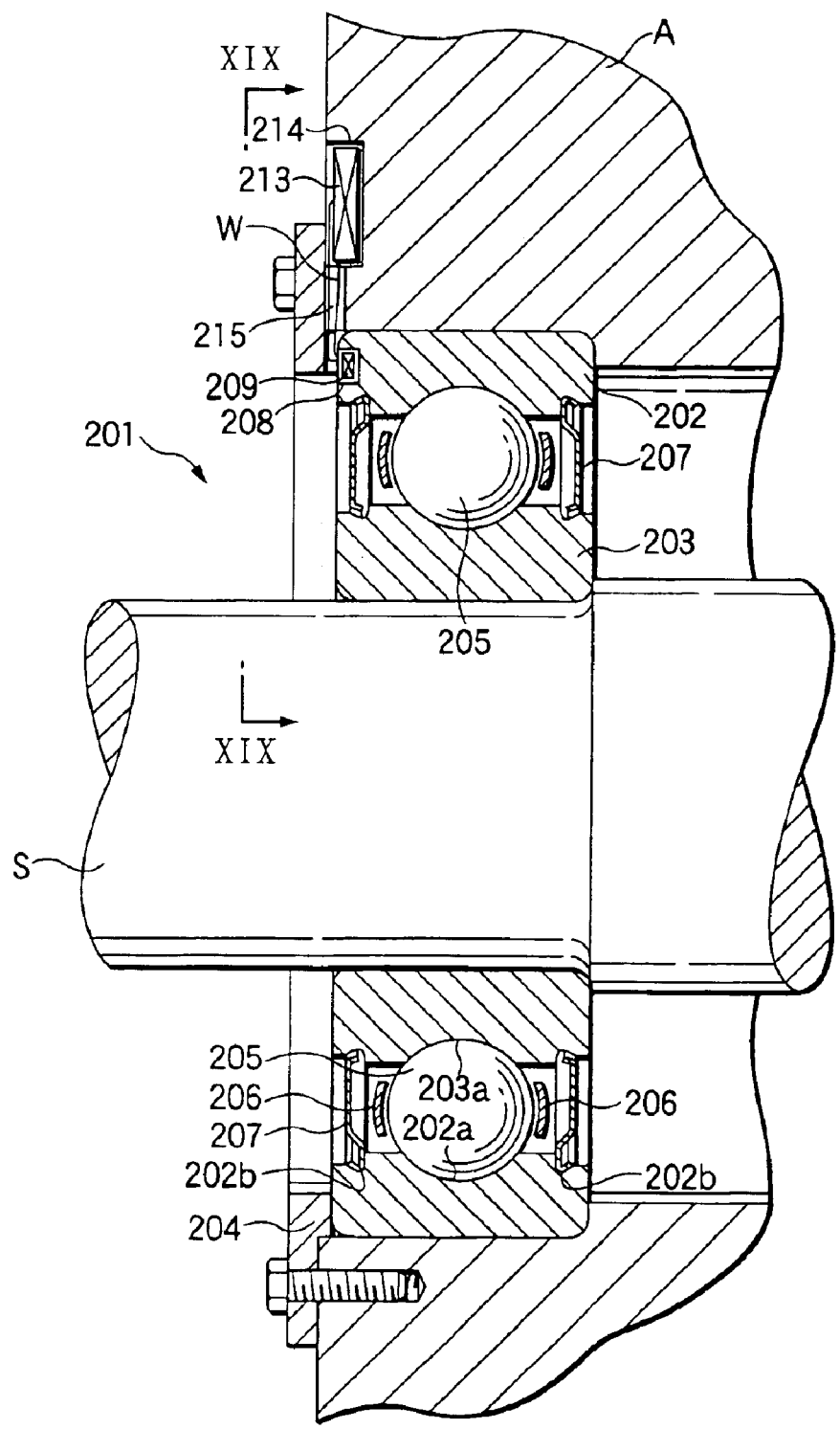
FIG. 18 is a sectional view showing a rolling bearing device, which is a thirteenth embodiment of the present invention.
Figure 19:
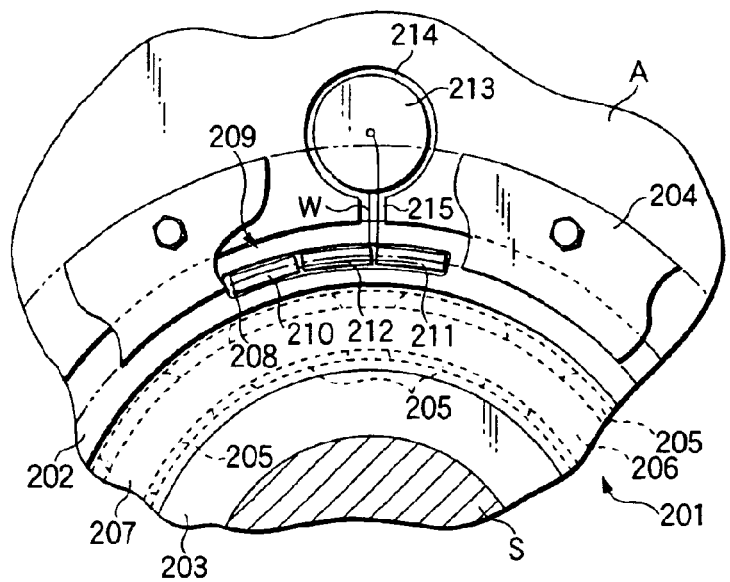
FIG. 19 is a cross sectional view, taken on line XIX—XIX of FIG. 18.

A thirteenth embodiment of the present invention will be described with reference to FIGS. 18 through 20. A rolling bearing device 201 shown in FIG. 18 is provided between a housing A as a stational part and a rotating shafts. The rolling bearing device 201 includes an outer ring 202 and an inner ring 203, which are examples of a raceway ring and, in particular, detects a vibration, a temperature, a rotational speed or the like of the outer ring 202 fitted to the housing A. The outer ring 202 is fitted to the end of the housing A, and held with a fixing ring 204 for preventing it from falling off. A recessed outer raceway 202a is formed at a central part of the inner peripheral surface of the outer ring 202. A recessed inner raceway 203a, is formed at a central part of the outer peripheral surface of the outer ring 203. A plurality of balls 205 as rolling elements are retained with a retainer 206 in the circumferential direction at equal intervals while being in rollably contacted with the outer raceway 202a and the inner raceway 203a. Shield mounting grooves 202b are respectively provided on both ends of the outer ring 202 as viewed in the widthwise direction, at locations closer to the inner ring. Shields 207 are respectively fitted to and supported by the shield mounting grooves 202b in order to protect the rolling surfaces of the outer raceway 202a, the inner raceway 203a, and the balls 205.

An arcuate recess 208, which continuously extends in the circumferential direction of the outer ring 202, is provided at a part of an end face of the outer ring 202. A sensor 209 is mounted within the arcuate recess 208 in such a fashion that the sensor 209 is not protruded out of the arcuate recess 208. The sensor 209, as shown in FIG. 19, includes a detecting part 210 for detecting an acceleration, temperature or rotational speed, a transmitting part 211 for transmitting a radio wave signal, and a control part 212 for controlling the transmitting part 211. The sensor 209 is supplied with electric power from a power source 213, e.g., a button-shaped battery, by way of a wire W. The power source 213 is placed within a recess 214 formed at a part of the housing A. A groove 215 is provided ranging from the arcuate recess 208 to the recess 214, and the wire W will be laid in the groove 215.

The detecting part 210 includes an acceleration sensor 216, a temperature sensor 217 and a rotating speed sensor 218. The acceleration sensor 216 is provided mainly for sensing a vibration, and may be a piezoelectric element which produces a potential difference in accordance with an acceleration variation caused by a vibration, or a strain gauge stuck onto a plate spring. The temperature sensor 217 maybe a thermistor whose electric resistance varies with a temperature variation. The detecting part 210 may include either of the acceleration sensor 216, the temperature sensor 217 or the rotating speed sensor 218 according to uses of the rolling bearing device 201. The arcuate recesses 208 may be formed at a plurality of locations of the end face of the rolling bearing device 201. In this case, the sensors 209 may be independently located in those recesses 208, or the detecting parts 210 maybe located in those recesses 208.

As described above, the arcuate recess 208 is provided on the static side, and the sensor 209 and the power source 213 are placed in the recess 208 such that the sensor 209.and the power source 213 are not protruded out of the outer surfaces of the housing A and the rolling bearing device 201. Therefore, there is no need of providing any special space for the mounting of the sensor 209 in the housing A or the shaft S. Accordingly, the rolling bearing device 201 may be interchanged with a conventional bearing. Further the least amount of machining is required for the rolling bearing device 201.

Figure 20:
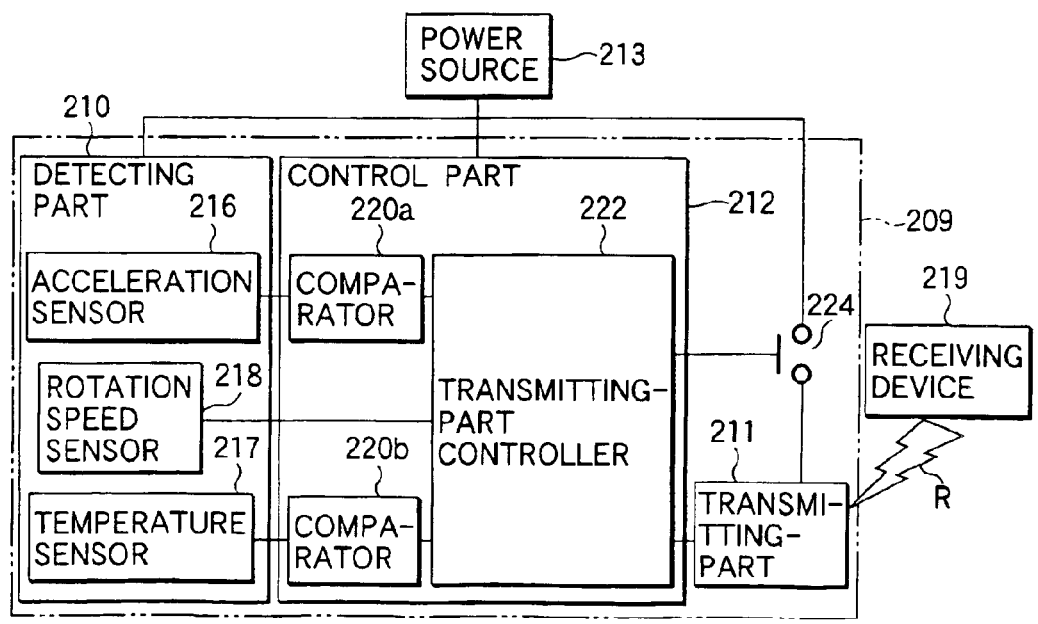
FIG. 20 is a block diagram showing an electrical expression of a sensor of the rolling bearing device of FIG. 18.

In the block diagram of FIG. 20, a signal derived from the acceleration sensor 216 of the detecting part 210 is input to a comparator 220a in the control part 212, and is compared with a predetermined acceleration in the comparator. A signal derived from the temperature sensor 217 is input to a comparator 220b, and compared with a predetermined temperature by the comparator 220b. Either of the signals derived from the sensors exceeds a threshold value, the control part 212 judges that something is wrong with the bearing (or the device using the bearing). Upon the judgement being an abnormality, a transmitting part controller 222 first turns on (closes) a switch 224, which is inserted in a path for supplying electric power to the transmitting part 211, in order to enable the transmitting part 211 to operate. Subsequently, the transmitting part controller 222 sends to the transmitting part 211 a signal for transmitting a radio wave signal R indicating that the acceleration sensor 216 or the temperature sensor 217 detected an abnormality of the bearing or the like. Then, the rotating speed at the detecting time of the abnormality may be simultaneously transmitted. Upon receipt of the signal, the transmitting part 211 transmits a radio wave signal R indicating that the acceleration sensor 216 or the temperature sensor 217 detected an abnormality of the bearing or the like. The radio wave signal R is received by a receiving device 219, which is located at a position spaced apart from the transmitting part 211.

Thus, the rolling bearing device 201 operates such that when the acceleration sensor 216, the temperature sensor 217 or the rotating speed sensor 218 detects an abnormality of the bearing or the like, the transmitting part 211 sends a radio wave signal R indicating the abnormality occurrence, but when the acceleration sensor 16 or the temperature sensor 217 produces a normal output signal, the transmitting part 211 does not emit a radio wave signal R indicating the normality.

Sensor-function checking device is further provided for informing that the sensor normally functions; it sends a radio wave signal R indicating that the sensor normally functions, at a fixed time interval (of e.g., 24 hours). Therefore, even in such a case that the sensor abnormally functions and fails to output an abnormality signal, there is no chance of making such a misjudgement that it normally functions.

One may discriminate between a normally operating sensor and an abnormally operating sensor in such a manner that different identification signals, such as audio signals different in frequency from each other, obtained when the sensor normally operates and when the sensor abnormally operates are incorporated into a radio wave R. The same thing is true for the discrimination between the radio wave signal R transmitted when the acceleration exceeds the threshold value of acceleration and the radio wave signal R transmitted when the temperature exceeds the threshold value of temperature.

In the embodiment, the transmitting part 211 sends a radio wave R in only the following cases; 1) the sensor 209 detects an abnormality; and 2) the sensor 209 normally operates. When no radio wave R is transmitted, the switch 224 for supplying electric power to the transmitting part 211 is in an OFF (open) state. Accordingly, no electric power is consumed in the transmitting part 211. Therefore, in a case where the power source 213 is a battery, the power consumption is lessened, and hence the battery once mounted is used for a long time.

The sensor 209 may be further reduced in size and power dissipation by fabricating the detecting part 210, the control part 212 and the transmitting part 211 into an integrated circuit.

In the embodiment of the invention, the bearing abnormality is judged by comparing an output signal of the acceleration sensor 216 with the threshold value of acceleration, and comparing an output signal of the temperature sensor 217 with the threshold value of temperature. In an alternative, the output signals of the acceleration sensor 216, the temperature sensor 217 and the rotating speed sensor 218 are converted into digital signals. Variations of the acceleration and temperature, or the correlation between variations of the acceleration and temperature are judged to determine that the bearing (or the device using the bearing) is abnormal. A radio wave signal R indicating the result of the determination is transmitted from the transmitting part 211.

The detecting part 210 forming the sensor 209, those circuits 220a, 220b and 222, and the power source 213 may be individually connected by the wire W, and insulated and bonded to the recess 208 of the outer ring. Those may be mounted on the flexible printed circuit board to form a sensor unit, to thereby facilitate the bonding work for fixing. It should be understood that the sensor 209 of the embodiment is presented by way of example, and an electrical arrangement of the sensor is not limited to that of block diagram shown in FIG. 20.

A fourteenth embodiment of the invention will be described with reference to FIGS. 21A and 21B. In the embodiment, equivalent portions are designated by like reference numerals used in the thirteenth embodiment.

A bearing device 231 shown in FIG. 21A is arranged such that an outer ring 202 is fitted to the inner side of the end of a housing A as a stational part, and an inner ring 203 is fitted to the outer side of the end of a rotating shaft S. The bearing device 231 thus constructed serves as a rolling bearing device for detecting an acceleration, temperature or rotating speed of the inner ring 202.

As shown in FIG. 21B, a recess 232 is formed in a part of the end face of the inner ring 203 along the circumferential direction of the inner ring 203. A sensor 209 is mounted in the recess 232. The power source 213 for supplying electric power to the sensor 209 is mounted on the end 233 of the shaft S, preferably, in a recess 234 formed at the center of the shaft S. A groove 235 is formed between the recess 232 of the inner ring 203 to which the sensor 209 is attached and the recess 234 in which the power source 213 is fitted, and a wire W is placed in the groove 235. A cover member 236 covering the end 233 of the shaft S is attached in order to prevent the inner ring from falling off, as shown in FIG. 21A. The cover member 236 also has a function to protect the power source 213, the wire W and the sensor 209. While the power source 213 and the wire W are arranged in the recess 234 and the groove 235 formed in the end 233 of the shaft S, those may be put in a recess and a groove formed in the inner side of the cover member 236, so that no machining of the shaft S is required.

In the bearing device 231 thus constructed, there is no need of machining the housing A, and is required less machining of the shaft S for the attachment of the bearing device to the shaft. The bearing device 231 thus constructed is capable of detecting an acceleration and a temperature of the inner ring 203 that is fitted to the rotating shaft S. As in the thirteenth embodiment, since the sensor 209 includes sensor-function checking device, the bearing device of the embodiment is capable of periodically and easily checking as to if the sensor 209 normally functions.

Figure 22B:
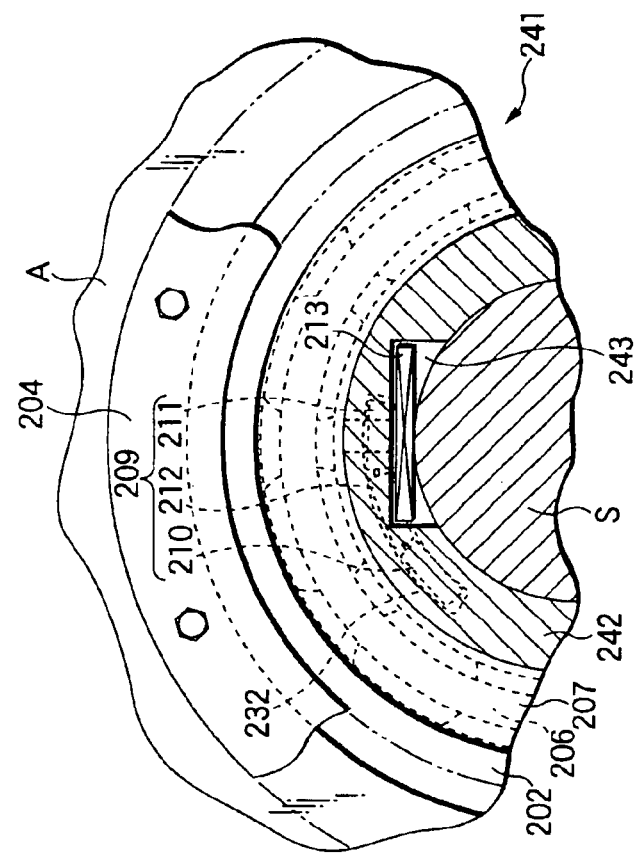
FIG. 22B is a side view, taken on line XXII—XXII of FIG. 22A.

A fifteenth embodiment of the present invention will be described with reference to FIGS. 22A and 22B. In the embodiment, equivalent portions are designated by like reference numerals used in the thirteenth and fourteenth embodiments.

Figure 22A:
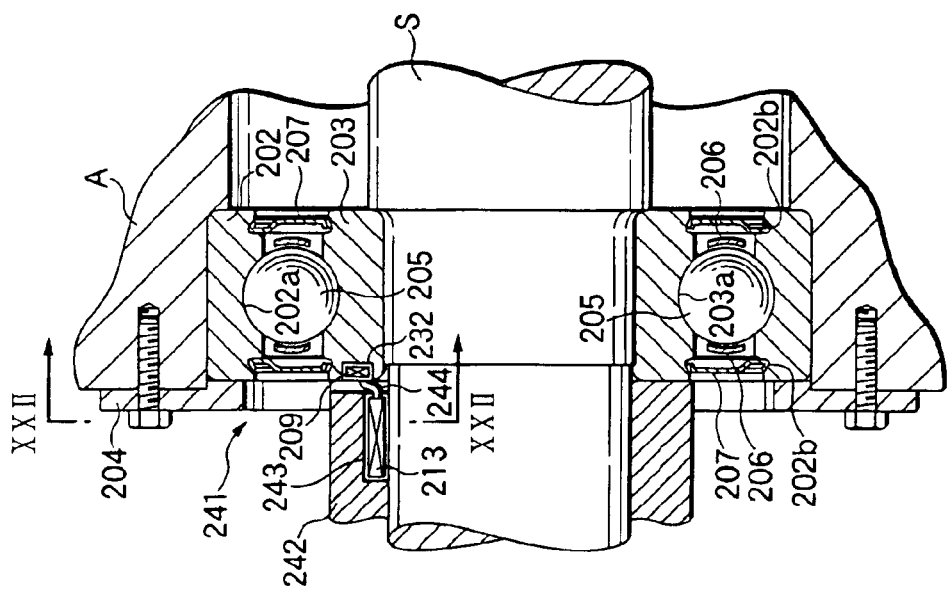
FIG. 22A is a sectional view showing a rolling bearing device, which is a fifteenth embodiment of the invention.

A bearing device 241 shown in FIG. 22A is arranged such that an outer ring 202 is fitted to the inner side of a housing A as a stational part, and an inner ring 203 is fitted to the outer side of an intermediate part of a rotating shaft S. The bearing device 241 thus constructed serves as a rolling bearing device for detecting an acceleration or temperature of the inner ring 203.

A recess 232 is formed in a part of the inner ring 203 while being opened to the inner peripheral surface of the inner ring 203. The recess 232 has a width extending along the circumferential direction and being longer than the depth of the inner ring 203. A sensor 209 is mounted in the recess 232. As shown in FIGS. 22A and 22B, a power source 213 for supplying electric power to the sensor 209 is placed in a recess 243 formed in a part of the inner surface of a sleeve 242. A groove 244 for connecting the recess 243 to the recess 232 of the inner ring 203 is formed in the end 242a of the sleeve 242. A wire W for electrically connecting the power source 213 to the sensor 209 is placed in the groove 244. The power source 213 and the sensor 209, as shown in FIG. 22A, are protected by the sleeve 242.

The bearing device 241 thus constructed is capable of detecting an acceleration, a temperature or a rotating speed of the inner ring 203 fitted to the shaft S, and may be provided at the intermediate part of the shaft S. The bearing device 241 does not require any special machining of the housing A and the shaft S. In this respect, the bearing device is readily applied to the already existing bearing. Further, as in the thirteenth embodiment, since the sensor 209 includes sensor-function checking device, the bearing device of the embodiment is capable of periodically and easily checking as to if the sensor 209 normally functions.

A sixteenth embodiment of the present invention will be described with reference to FIGS. 23A and 23B. In the embodiment, equivalent portions are designated by like reference numerals used in the thirteenth to fifteenth embodiments.

A bearing device 251 shown in FIGS. 23A and 23B is arranged such that an outer ring 202 is fitted to the end of a housing A as a stational part, and an inner ring 203 is fitted to the outer side of an intermediate portion of a rotating shaft S. In the sensor 209, a detecting part 210 includes a temperature sensor 217, and has a function similar to that of the thirteenth embodiment. In this case, apart of the sensor 209 is protruded out of the outer surface of the bearing device 251. In this case, the protruded part of the sensor 209 usually faces the space, and is not protruded out of a prolongation of the outer surface of the fixing ring 204. As shown in FIGS. 23A and 23B, the detecting part 210, the control part 212 and the transmitting part 211, while being arranged along the circumferential direction, are mounted on the shields 207 which is fitted to and supported by the outer ring 202. Accordingly, the power source 213 is provided on the housing A as in the thirteenth embodiment. On the other hand, the shields 207 are supported on the inner ring 203, it is preferable that a sleeve 242 is provided as in the fifteenth embodiment, and that the power source 213 is located on the shaft S side.

In the bearing device 251 thus constructed, any special machining of the bearing device is not required, and it may be mounted on the housing A with less machining of it. The bearing device 251 is capable of detecting a temperature of the bearing device 251. Further, as in the thirteenth embodiment, since the sensor 209 includes sensor-function checking device, the bearing device of the embodiment is capable of periodically and easily checking as to if the sensor 209 normally functions.

A seventeenth embodiment of the present invention will be described with reference to FIGS. 24A and 24B. In the embodiment, equivalent portions are designated by like reference numerals used in the thirteenth to sixteenth embodiments.

A bearing device 261 shown in FIG. 24A is arranged such that the outer ring 202 is fitted to the inner side of the housing A as a stational part, and the inner ring 203 is fitted to the outer periphery side of the rotating shaft S as a rotating part. As shown in FIGS. 24A and 24B, a sensor 209 is mounted in a recess 208 which is circumferentially formed at a part of the end face of the outer ring 202. The sensor is used for sensing an acceleration and a temperature of the outer ring 202.

A power source 213 for supplying electric power to the sensor 209 is a small battery so configured as to be adaptable for its installing place and, together with the sensor 209, is mounted in the recess 208. Accordingly, in the embodiment, unlike the thirteenth embodiment, there is no need of mounting the power source 213 on the housing A, and hence of machining the housing A for its mounting. Further, the sensor 209 and the power source 213 are mounted so as not to be protruded out of the recess 208. Therefore, the bearing device 261 may easily be applied to an already existing apparatus by merely replacing a conventional bearing with the bearing device of the invention.

As in the thirteenth embodiment, since the sensor 209 includes sensor-function checking device, the bearing device of the embodiment is capable of periodically and easily checking as to if the sensor 209 normally functions. Incidentally, to detect an acceleration and a temperature of the inner ring 203, a recess is formed at a part of the end face of the inner ring 203 along the circumferential direction, and the sensor 209 and the power source 213 are mounted in the recess.

An eighteenth embodiment of the present invention will be described with reference to FIGS. 25A and 25B. In the embodiment, equivalent portions are designated by like reference numerals used in the thirteenth to seventeenth embodiments.

A bearing device 271 shown in FIG. 25A is arranged such that the outer ring 202 is fitted to the inner side of the housing A as a stational part, and the inner ring 203 is fitted to the outer peripheral side of the rotating shaft S. As shown in FIG. 25A, the sensor 209 is provided on the shields 207 supported on the outer ring 202, while being arranged in the circumferential direction as shown in FIG. 25B. A power source 213 for supplying electric power to the sensor 209 is a small battery so configured as to be adaptable for its installing place and, together with the sensor 209, is mounted in the recess 207. Accordingly, in the embodiment, unlike the sixteenth embodiment, there is no need of mounting the power source 213 on the housing A, and hence of machining the housing A for its mounting. Therefore, the bearing device 271 may easily be applied to an already existing apparatus by merely replacing a conventional bearing with the bearing device of the invention. The shields 207 may be supported on the inner ring 203.

Further, as in the thirteenth embodiment, since the sensor 209 includes sensor-function checking device, the bearing device of the embodiment is capable of periodically and easily checking as to if the sensor 209 normally functions.

Figure 26B:
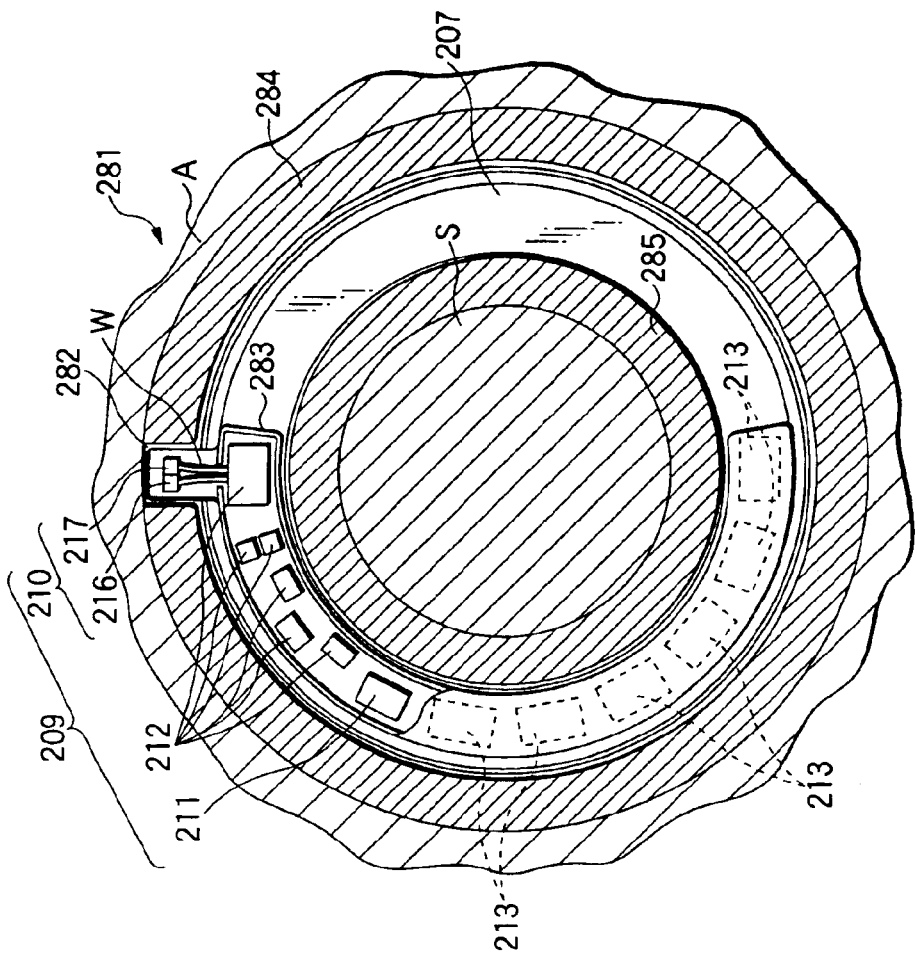
FIG. 26B is a side view, taken on line XXVI—XXVI of FIG. 26A.

A nineteenth embodiment of the present invention will be described with reference to FIGS. 26A and 26B. In the embodiment, equivalent portions are designated by like reference numerals used in the thirteenth to eighteenth embodiments.

Figure 26A:
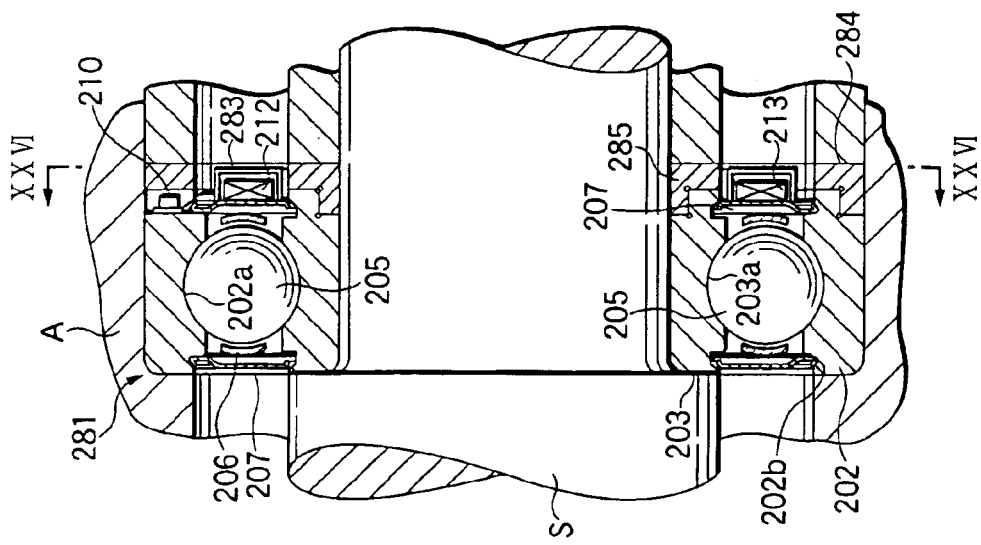
FIG. 26A is a sectional view showing a rolling bearing device, which is a nineteenth embodiment of the invention.

A bearing device 281 shown in FIG. 26A is arranged such that an outer ring 202 is fitted to the intermediate part of a housing A as a stational part, and an inner ring 203 is fitted to the outer peripheral side of an intermediate part of a shaft S as a rotating part. A detecting part 210 of a sensor 209 includes an acceleration sensor 216 and a temperature sensor 217, and is mounted in a recess 282 of the outer ring 202. As shown in FIG. 26B, the control part 212 and the transmitting part 211 of the sensor 209 are mounted on a shield 207 which is fitted to and supported on the outer ring 202 in such a manner as to arranged circumferentially. That is, in the sensor 209, the acceleration sensor 216 and the temperature sensor 217 for sensing an acceleration and a temperature are placed at a location to be detected. Incidentally, in a case where the location to be detected is the inner ring 203, a recess is formed in the inner ring 203. The detecting part 210 is mounted in the recess, and the control part 212 and the transmitting part 211 are circumferentially mounted on the shield 207 which is fitted to and supported on the inner ring 203.

A power source 213 is a small battery so configured as to be adaptable for its installing place and, together with the control part 212 and the transmitting part 211, is mounted on the shield 207. A protecting member 283 is provided on the shield 207, for covering the control part 212, the transmitting part 211 and the power source 213. The protecting member 283 is preferably made of a material permitting radio wave to pass therethrough, such as a plastic material. Where the protecting member 283, as shown in FIG. 26A, is protruded from the outer ring 202 and the inner ring 203, a cover, preferably a ring-like protecting cover (referred to as a protecting ring) is provided. Specifically, an outer-ring protecting ring 284 is provided on the outer ring side, and an inner-ring protecting ring 285 is provided on the inner ring side. The outer-ring protecting ring 284 and the inner-ring protecting ring 285 are each wider than the width of the protruded part of the protecting member 283. Those are brought into engagement with the outer ring 202 and the inner ring 203 with steps being formed therebetween. Accordingly, the detecting part 210 located in the recess 282 is covered with and protected by the outer-ring protecting ring 284. If required, the outer ring 202 and the inner ring 203 are previously selected in width so as to prevent the outer-ring protecting ring 284 from protruding out of the end faces of the outer ring 202 and the inner ring 203.

Thus constructed bearing device, the mounting of the bearing device 281 may be carried out without machining the housing A and the shaft S. Therefore, a conventional bearing may easily be replaced with the bearing device 281. The bearing device of the embodiment is excellent in durability since the sensor 209 and the power source 213 are protected by the protecting member 283 and the outer-ring protecting ring 284.

Further, as in the thirteenth embodiment, since the sensor 209 includes sensor-function checking device, the bearing device of the embodiment is capable of periodically and easily checking as to if the sensor 209 normally functions.

The inside of the protecting member 283 is preferably molded of an insulating filling member, e.g., a synthetic resin, whereby the control part 212, the transmitting part 211, the power source 213 and the like are stably fixed. In an environment where the sensor 209 is constantly irradiated with external light, it is preferable to use a material to allow light to transmit therethrough for the protecting member and the filling material, and a solar battery for the power source 213. By so doing, no care must be taken of electric power consumption.

In a case where the object to be detected is a vibration, temperature and the like of the inner ring 203, the shield 207 is provided so as to be fitted to the inner ring 203 on which the detecting part 210 is mounted. The control part 212 and the transmitting part 211 of the sensor 209 and the power source 213 are mounted on the shield 207.

Next, a twentieth embodiment of the present invention will be described with reference to FIGS. 27A and 27B. In the embodiment, equivalent portions are designated by like reference numerals used in the thirteenth to nineteenth embodiments.

A bearing device 291 shown in FIG. 27A is arranged such that an outer ring 202 is fitted to the inner side of an intermediate part of a housing A as a stational part, and an inner ring 203 is fitted to the outer side of the intermediate part of a shaft S as a rotating part. A ring for outer ring 292, which is fastened to the outer ring 202 in a unitary form, is mounted on the end face of the outer ring 202. A ring for inner ring 293, which is fastened to the inner ring 203 in a unitary form, is mounted on the end face of the inner ring 203. In the embodiment, the ring for inner ring 293 of which the width is equal to that of the ring for outer ring 292, is used. If required, this ring 93 for inner ring may be omitted.

The ring for outer ring 292 includes a flange 94 formed integrally therewith, which extends toward the ring for inner ring 293 so as to cover the shield 207. The control part 212 and the transmitting part 211 of the sensor 209 and the power source 213 for supplying electric power to the sensor 209, as shown in FIG. 27B, are disposed along the circumferential direction in which the flange 294 expands, on a surface of the flange 294, which faces the shield 207, i.e., an inner surface 294a. The detecting part 210 of the sensor 209 is mounted in a recess 295, which is formed in a part of the ring 292 for outer ring.

The ring 292 for outer ring is preferably made of a material, which permits the radio wave R emitted from the transmitting part 211 to pass therethrough, such as a plastic material. An antenna for transmitting the radio wave R may be mounted on the reverse side, i.e., an outer surface 294b, of the flange, which is a counterpart of the side of the flange on which the transmitting part 211 is mounted.

The mounting of the bearing device 291 thus constructed may be carried out without machining the housing A and the shaft S. Therefore, the bearing of an existing apparatus may easily be replaced with the bearing device 291 to which the sensor 209 for sensing the vibration and temperature is mounted. Since the sensor 209 is mounted on the side of the ring 292 for outer ring, which faces the shield 207 and is protected against the outside, its durability is good.

The control part 212 and the transmitting part 211 of the sensor 209, and the power source 213 may be mounted on an arcuate board, which is curved along the shape of the flange 294, viz., a flexible printed circuit board, and then stuck to the flange 294. The detecting part 210, together with the control part 212 and the transmitting part 211, may be mounted on the flange 294.

In a case where a location to be detected is the inner ring 203, a flange is formed integral with the ring for inner ring 293, while extending toward the ring for outer ring 292. The control part 212 and the transmitting part 211, and the power source 213 are mounted on the flange. The detecting part 210 of the sensor 209 is mounted in the recess formed at a part of the ring for inner ring 293.

Also in the twentieth embodiment, the sensor 209 includes sensor-function checking device, as in the thirteenth embodiment. Therefore, the bearing device of the embodiment is capable of periodically and easily checking as to if the sensor 209 normally functions.

In the thirteenth to twentieth embodiments, the single-row deep groove ball bearing is used for a typical example of the rolling bearing. It will readily be understood that also when the invention is applied to other types of rolling bearings, such as a thrust ball bearing and a cylindrical roller bearing, rolling bearings each containing a sensor for sensing a vibration or a temperature, may be realized.

Figure 28B:
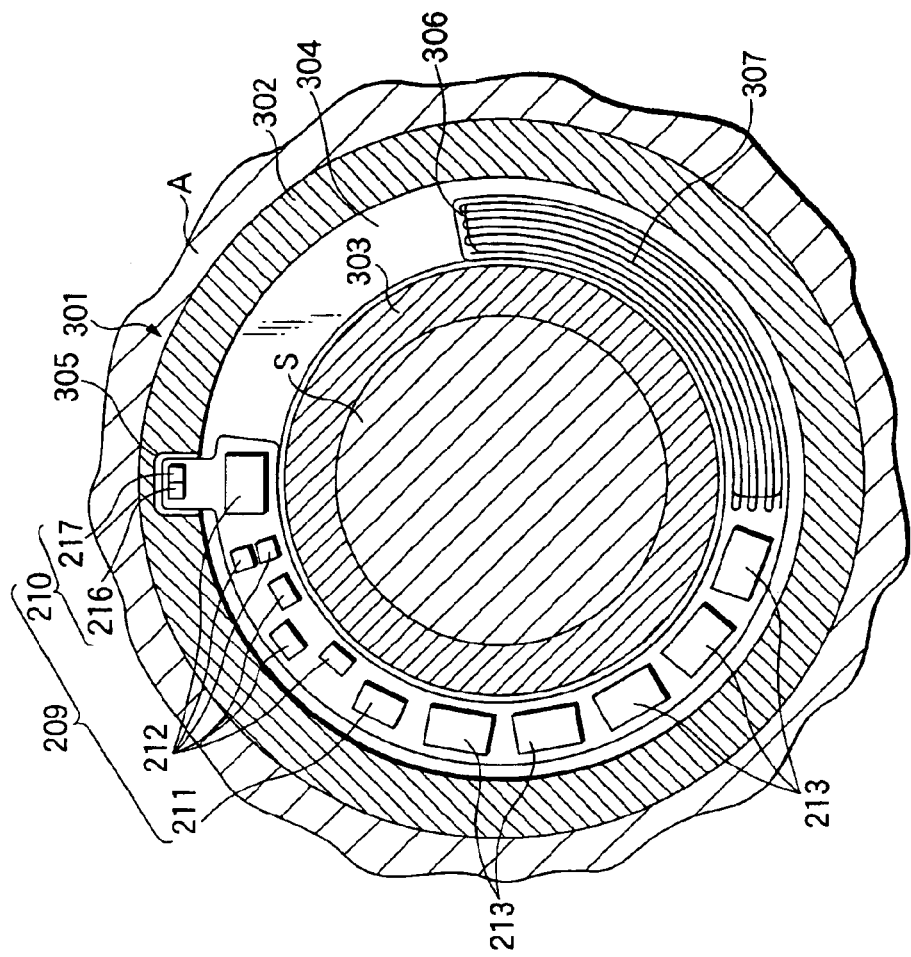
FIG. 28B is a side view, taken on line XXVIII—XXVIII of FIG. 28A.

A twenty-first embodiment of the present invention will be described with reference to FIG. 28A and 28B. In the embodiments, equivalent portions are designated by like reference numerals used in the thirteenth to twentieth embodiments.

Figure 28A:
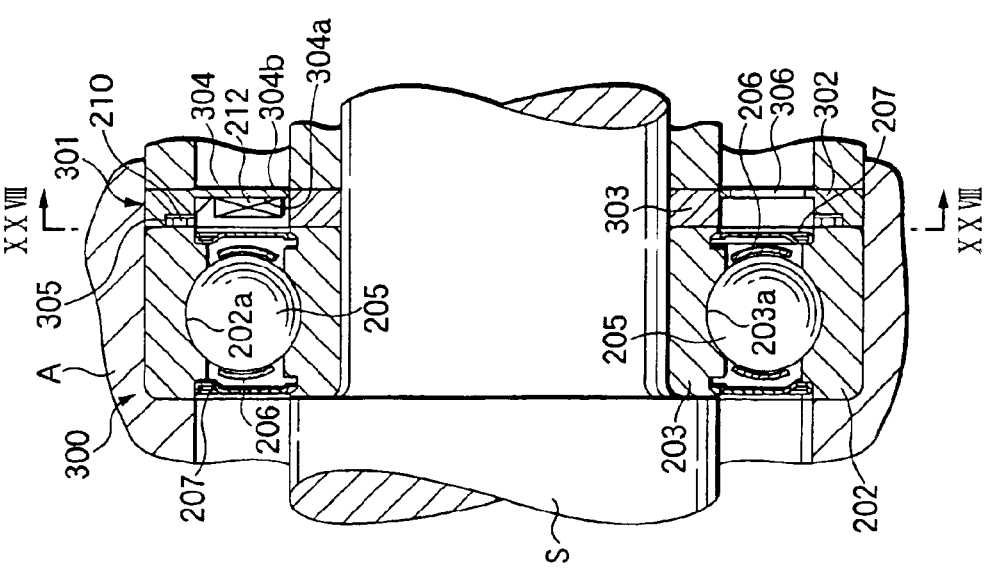
FIG. 28A is a sectional view showing a rolling bearing device, which is a twenty-first embodiment of the invention.

A ring for outer ring 302 serving as a ring with sensor 301 shown in FIG. 28A is interference fitted to a housing A to which an outer ring 202 of a bearing 300 is interference fitted, and the ring with sensor 301 is movable together with the outer ring 202. As in the twentieth embodiment, a ring for inner ring 303 is provided in the end face of the inner ring 303. A flange 304 protruding toward the shaft S is formed on the inner periphery of a ring with sensor 301. As shown in FIG. 28B, a control part 212 and the transmitting part 211 of the sensor 209, and the power source 213 for supplying electric power to the sensor 209 are mounted on a surface of the flange 304 which faces the shields 207 of the bearing 300, i.e., an inner surface 304a, while being arranged in the circumferential direction in which the flange 304 expands. A detecting part 210 of a sensor 209, which includes an acceleration sensor 216 for sensing a vibration and a temperature sensor 217 for sensing a temperature, is mounted in a recess 305 formed at a part of the outer ring 301.

An arcuate opening 306 is formed in the flange 304. The opening 306 expands in the circumferential direction in which the flange expands, and passes through the flange 304. An antenna 307 for emitting a radio wave signal R which is output from the transmitting part 211, is mounted on the inner surface 304a, while aligning with a position of the opening 306. Accordingly, in the embodiment, the ring with sensor 301 may be made of a metallic material. In a case where the opening 306 is not formed in the flange 304, the ring with sensor 301 is preferably made of a material permitting radio wave to pass therethrough, such as a plastic material or the antenna 307 is mounted on an outer surface 304b of the flange 304.

The detecting part 210 may be mounted on the inner surface 304a of the flange 304. The sensor 209, the power source 213 and the antenna 307 maybe mounted on a flexible printed circuit board, and then stuck to the inner surface 304a. The sensor 209, the power source 213 and the antenna 307 may be molded of non-conductive resin, whereby, the protection of the sensor 209 is secured.

With the ring with sensor 301 thus constructed, there is no need of machining the housing A or the shaft S with the bearing 300 mounted thereon. Further, the existing bearings maybe used as they are, and the bearings used for the conventional apparatus may have useful effects as those by the thirteenth to twentieth embodiments described above. The sensor 209, the power source 213 and others are mounted on the inner surface 304a of the flange 304, and those are protected against the outside. In this respect, its durability is excellent.

When a location to be detected is the inner ring 203, the ring with sensor having the flange projected toward the housing A is interference fitted to the shaft S to which the inner ring 203 is interference fitted, and the ring with sensor and the outer ring 202 are movable together with each other. The control part 212, the transmitting part 121 and the power source 213 are mounted on the flange of the ring with sensor, and the detecting part 210 of the sensor 209 is mounted in the recess formed at a part of the ring with sensor.

Also in the twenty-first embodiment, since the sensor 209 includes sensor-function checking device as in the thirteenth embodiment, the bearing device of the embodiment is capable of periodically and easily checking as to if the sensor 209 normally functions.

In the twenty-first embodiment, the single-row deep groove ball bearing is used for a typical example of the rolling bearing, and the ring 301 having the sensors for sensing a vibration and temperature is discussed. It will readily be understood that also when the invention is applied to other types of rolling bearings, such as a thrust ball bearing and a cylindrical roller bearing, rolling bearings each containing a sensor for detecting a vibration or a temperature, may be realized.

As seen from the foregoing description, the invention succeeds in providing a rolling bearing device and a ring with sensor for the rolling bearing device in which there is no need of specially forming a large space for mounting the sensor in the housing or the shaft, and the least working of the bearing is required. When the sensor normally functions, a radio wave indicating that the sensor is normal is transmitted at fixed time intervals. Accordingly, one can readily know that the sensor normally functions.

Figure 29:
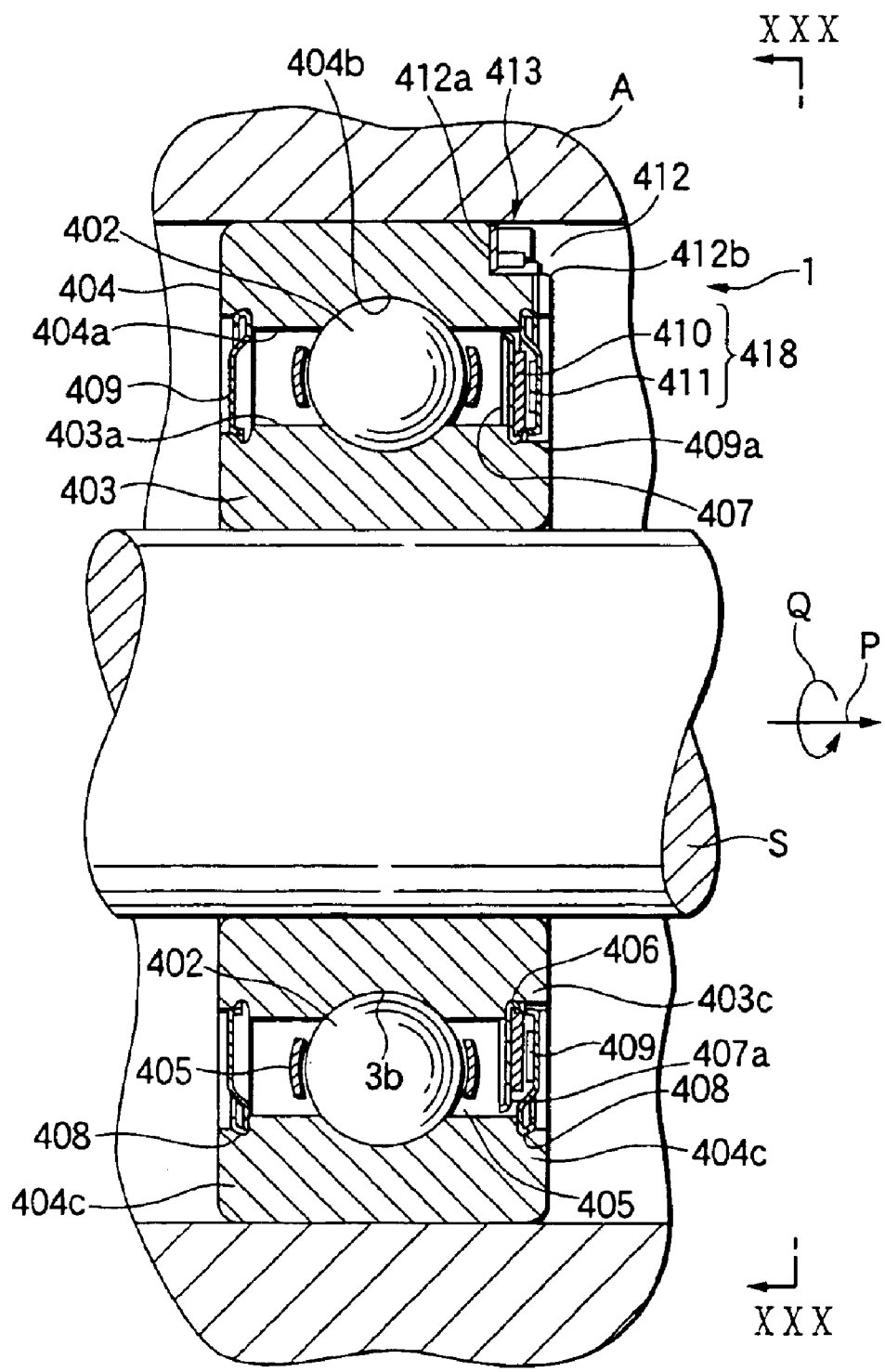
FIG. 29 is a sectional view showing a bearing device with sensor, which is a twenty-second embodiment of the invention.
Figure 30:
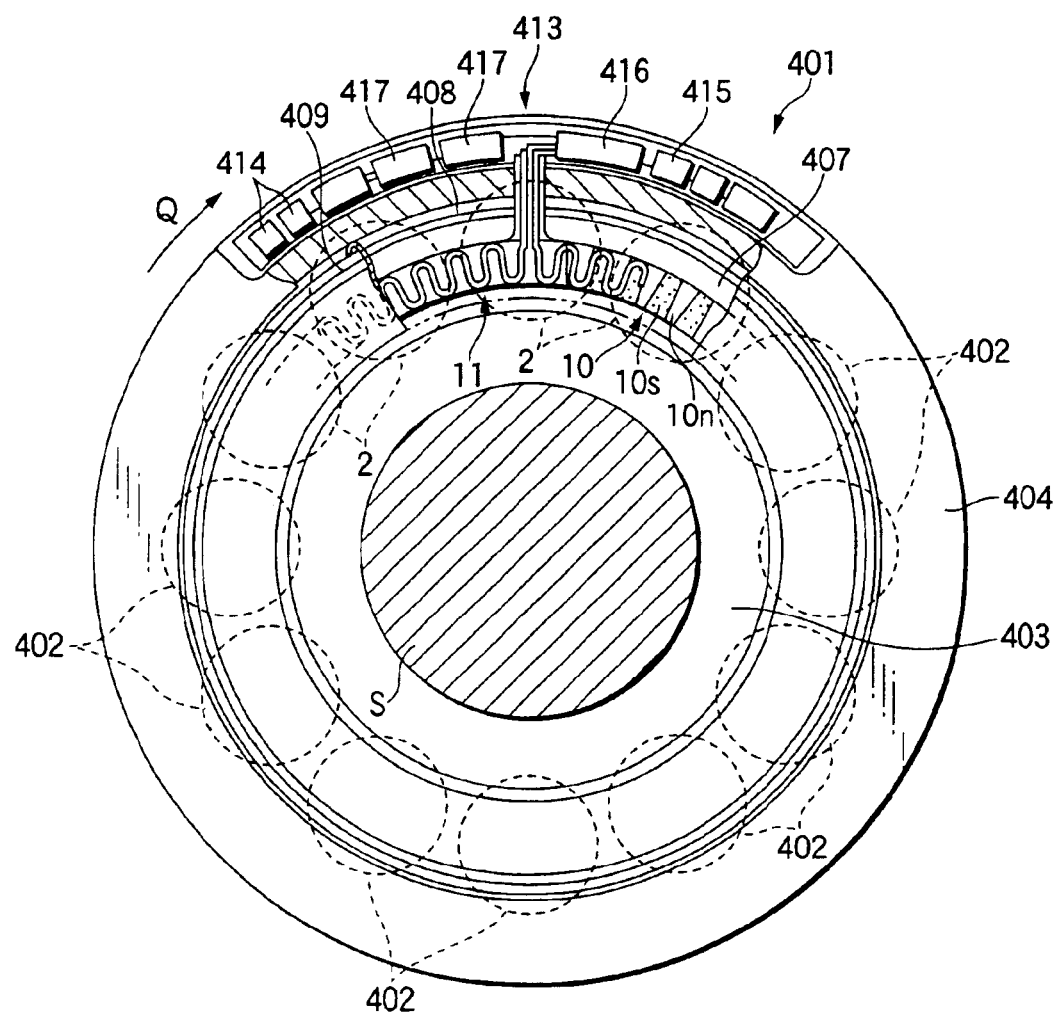
FIG. 30 is a cross sectional view, partly cut out, and taken on line XXX—XXX in FIG. 29.

A bearing device with sensor 401 according to a twenty-second embodiment will be described with reference to FIGS. 29 through 31. As shown in FIG. 29, the rolling bearing with sensor 401 includes a plurality of balls 402 as rolling elements, and a pair of raceways, that is, an inner ring 403 being a first raceway and an outer ring 404 being a second raceway, those raceways rotating relative to each other via the balls 402 being interposed therebetween. The balls 402 are arranged in the circumferential direction Q at equal intervals within a retainer 405 (FIG. 30). A recessed inner raceway 403b is formed at a central part of the outer peripheral surface 403a of the inner ring 403. The balls 402 are in rolling contact with the inner raceway 403b. A recessed outer raceway 404b is formed at a central part of the outer peripheral surface 404a of the outer ring 404. The balls 402 are in sliding contact with the outer raceway 404b. The outer ring 404 is secured to the housing A, and the inner ring 403 supports the rotating shaft S.

A first groove 406 is formed in one of the ends 403c of the outer peripheral surface 403a of the inner ring 403 as viewed in the width direction (in a direction P along the axial line of the shaft S), while extending over the entire circumference thereof. A first shield 407 is fitted to the first groove 406 thus formed. The first shield 407 is annularly formed while expanding in the radial direction and in the circumferential direction Q of the inner ring 403. Second shields 409 are respectively fitted into second grooves 408, which are formed in both ends 404c of an inner peripheral surface 404a of the outer ring 404. The second shields 409 are annularly formed in a state that it overlaps with the first shield 407 in the direction P along the axis of the shaft S, and expands in the radial direction and in the circumferential direction Q of the outer ring 404.

The annular magnet 410 is mounted on an outer peripheral surface 407a (opposite to a surface facing the balls 402) of the first shield 407, which is perpendicular to the axial line of the shaft S. The magnet 410 extends along a direction of the outer peripheral surface 407a. The magnet 410 is magnetized to have N poles 410n and S poles 410s, which are alternately arranged in the circumferential direction Q of the inner ring 403 at equal intervals. The magnet 410 may be any one obtained by molding a rubber magnet and a plastic magnet containing ferrite powder, a rare earth magnet or a ferrite magnet, if it is a permanent magnet magnetized to have N poles and S poles being arranged in the circumferential direction Q. Further, in the first shield 407, when a magnetic circuit is formed by using a magnetic material in cooperation with the magnet 410 so as to intercept the magnetic lines, its magnetic influence on the rolling bearing with sensor 401 is lessened.

The conductor 411 is mounted on the inside surface 409a of the second shield 409, which is confronted with the magnet 410, while being spaced from the latter by a fixed distance from the magnet 410 in the axial direction P of the shaft S. The conductor 411 is extended annularly along the magnet 410 in the circumferential direction Q, while being meandered to form rectangular parts radially arranged at intervals each equal to the pole-to-pole distance of the magnet 410.

A recess 412 is formed in a part of the outer peripheral edge 404c of the outer ring 404, which corresponds to the second shield 409 to which the conductor 411 is mounted. A sensor 413 is mounted on a flat surface 412a of the recess 412, which is perpendicular to the axial line of the shaft S The sensor 413 may be mounted on a flexible printed circuit board, and arranged along the cylindrical surface 412b of the recess 412. The recess 412 may be molded of resin and the like.

Figure 31:
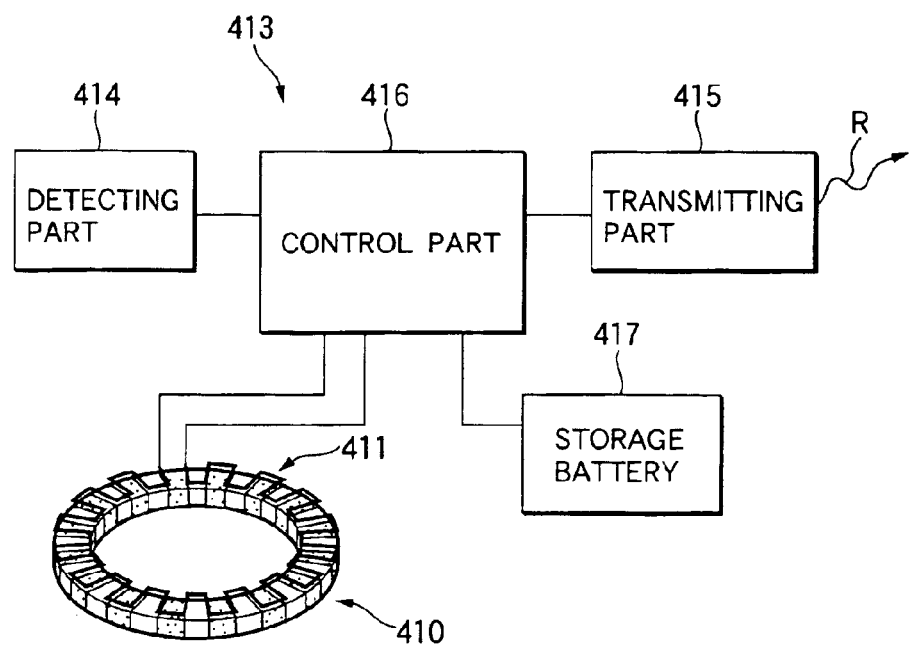
FIG. 31 is a block diagram showing the bearing device with sensor of FIG. 29.

The sensor 413, as shown in FIG. 31, includes a detecting part 414 for detecting vibration or temperature, a transmitting part 415 for transmitting a radio wave signal R, and a control part 416 for controlling the transmitting part 415 in accordance with the output signal of the detecting part 414. The control part 416 is connected to both ends 411a of the conductor 411, and a storage battery 417 which, together with the sensor 413, is placed in the recess 412, and includes a power source circuit (not shown).

A specific example of the detecting part for detecting vibration is a vibration sensor having an acceleration sensor, which is constructed by a piezoelectric element or strain gauge. A specific example of the detecting part for detecting temperature is a temperature sensor containing a thermistor, a temperature sensing resister, a thermocouple or the like, or an IC temperature sensor, which, together with the circuit, is fabricated into an integrated circuit.

Figure 32:
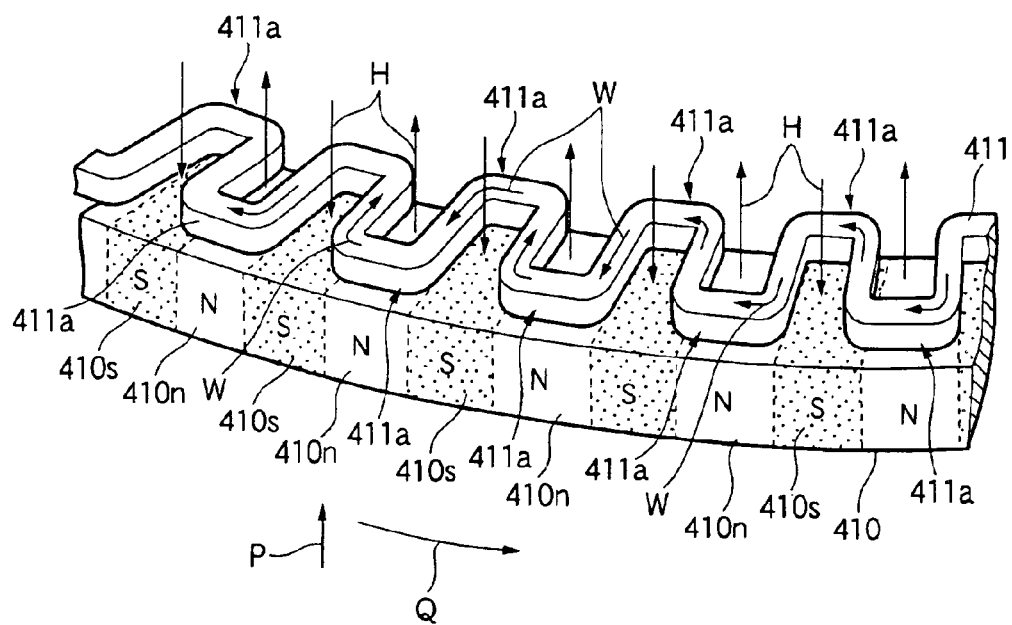
FIG. 32 is a perspective view showing apart of a structure including a magnet and a conductor of the bearing device with sensor of FIG. 29.

An operation of the rolling bearing with sensor 401 thus constructed will be described. The outer ring 404 is fixed to the housing A and the inner ring 403 is rotated together with the shaft S. That is, when the inner ring 403 and the outer ring 404 rotate relative to each other, the magnet 410, together with the inner ring 403, rotates with respective to the conductor 411, as shown in FIG. 32. The conductor 411 is meandered at intervals each equal to the pitch of the magnetic poles of the magnet 410. The conductor may be considered as a semicircular coil in which the winding directions of the rectangularly bent parts 411a of the conductor are alternately inverted. Accordingly, when the magnet 410 rotates, a magnetic field H formed around the magnet 410 moves together with the magnet 410. As a result, a direction of the magnetic field H crossing the meandering faces of the conductor 411 alternately changes with respective to the conductor 411.

Accordingly, an electromotive force is generated so that current flows in such a direction as to cancel the magnetic field H, which passes through a space within each the rectangularly bent part 411a, viz., in a direction W at a moment shown in FIG. 32. The magnetic field H alternately varies with respective to the conductor 411. Accordingly, an electromotive force generated in the conductor 411 also alternately varies. And hence, an AC electromotive force appears at both ends 411a of the conductor 411. In this respect, the magnet 410 and the conductor 411 cooperate to form an electric generator 418; viz., when the magnet and the conductor 411 rotate relative to each other, an electromotive force is generated.

Then, since the magnet 410 and the conductor 411 are respectively provided in an annular shaped and rotate relative to each other, the electromotive force generated at both ends of the conductor has little variation even when the dimensional uniformity is lost to some extent as to the circularity of each of the magnet and the conductor, distance between them, pole-to-pole distance, meandering interval, and the like. Accordingly, a stable electric power is generated.

Since conductor 411 is meandered in the radial direction, when it rotates relative to the magnet 410, an electromotive force is generated. When the conductor is meandered at intervals each equal to the pole-to-pole distance in the present invention embodiment, the electromotive force generated in the conductor 411 is uniform in phase, so that a more stable outputting of it is secured. Further, the conductor 411 is meandered while rectangularly bent in the embodiment, it crosses the magnetic field H developed by the magnet 410 over a broader area. As a result, a larger electromotive force is produced.

The conductor 411 may be formed on a printed circuit board or a flexible printed circuit board by etching. In this case, it may be formed in the form of a multiple of layers. If either of coils formed as below is used, an electromotive force generated is large: a coil in which a conducting wire is plurally wound along the outer surface of the second shield in such a manner that it is meandered, while rectangularly bent, at intervals each equal to the pole-to-pole distance of the magnet; and a coil in which solenoids are arranged in the circumferential direction Q and along the outer surface of the magnet 410, each solenoid being such that the winding direction of the conducting wire is inverted at intervals each equal to the pole-to-pole distance of the magnet 410. If a ferromagnetic member, e.g., iron core, is located within each rectangularly bent part of the conductor or at the center of the solenoid, the generated electromotive force is further increased.

There is a chance that eddy current is generated in the second shield 409 on which the conductor 411 is mounted since a magnetic field whose direction is inverted every pole of the magnet 410 successively passes through the second shield annularly shaped when the magnet 410 rotates relative to the second shield. To avoid this, it is preferable to make the second shield of a non-magnetic material, e.g., plastic or resin.

When the magnet 410 rotates relative to the conductor 411, a frequency of the AC electromotive force appearing at both ends 411a of the conductor 411 is proportional to the rotational speed of the bearing. This implies that the rotational speed of the bearing can be detected in a manner that a frequency of the electromotive force is detected by the control part 416, and the rotational speed of the bearing is obtained based on an output variation of the frequency.

In this case, since the magnet 410 and the conductor 411 are annular in shape and rotate relative to each other, the electromotive force appearing at both ends 411a of the conductor 411 has little variation even when the dimensional uniformity is lost to some extent as to the circularity of each of the magnet and the conductor, distance between them, pole-to-pole distance, meandering interval, and the like. Accordingly, the accuracy of detecting the rotational speed of the bearing, which is measured based on the electromotive force, has little variation.

The AC electromotive force generated is rectified by a rectifying circuit contained in the control part 416, and the resultant is utilized for the electric power for the sensor 13. Information of vibration or temperature, detected by the detecting part 414 of the sensor 413, together with frequency information of the electromotive force generated in the conductor 411, is signal-processed by the control part 416, and subjected to comparison judging process, and the resultant is sent from the transmitting part 415 in the form of radio wave R. Accordingly, information about a operating state of the rolling bearing with sensor 401 may be obtained when the radio wave R is received by a receiver, which is separately provided at a location remote from the rolling bearing with sensor 401. Further, it is noted that the detecting information is output in a wireless manner. Because of this feature, there is eliminated troublesome work of connecting and disconnecting the wires every time the shaft S to which the rolling bearing with sensor 401 is mounted and its vicinal structure are disassembled or assembling.

The storage battery 417, which, together with the sensor 413, is placed in the recess 412, is charged by an electric power generated through the rotation of the magnet 410 relative to the conductor 411, under control of a power source circuit of the control part 416. When the rotational speed of the rolling bearing with sensor 401 decreases, and an electric power generated through the rotation of the magnet 10 relative to the conductor 411 is insufficient for the power consumption by the sensor 413, the storage battery 417 discharges electric power to make up for the deficiency of the electric power. Thus, even when the electric power generated through the rotation of the magnet 410 relative to the conductor 411 is insufficient, the rolling bearing with sensor 401 is able to carry out the detecting operation reliably and accurately.

A third shield (not shown) made of a magnetic material may be located as a back yoke at a position opposite to the first shield 407 with respective to the second shields 409. Then, since the influence of the external magnetic field on it is lessened even when the rotational speed is slow and the electromotive force is small, the rotational speed can be detected more accurately. In this case, it is preferable that the third shield is rotated with the inner ring on which the magnet 410 is supported, to avoid such an unwanted situation that eddy current is generated in the third shield and the shield is heated.

A bearing device with sensor 421 according to a twenty-third embodiment will be described with reference to FIGS. 33 and 34. In those figures, equivalent portions are designated by like reference numerals used in the twenty-second embodiment.

Figure 33:
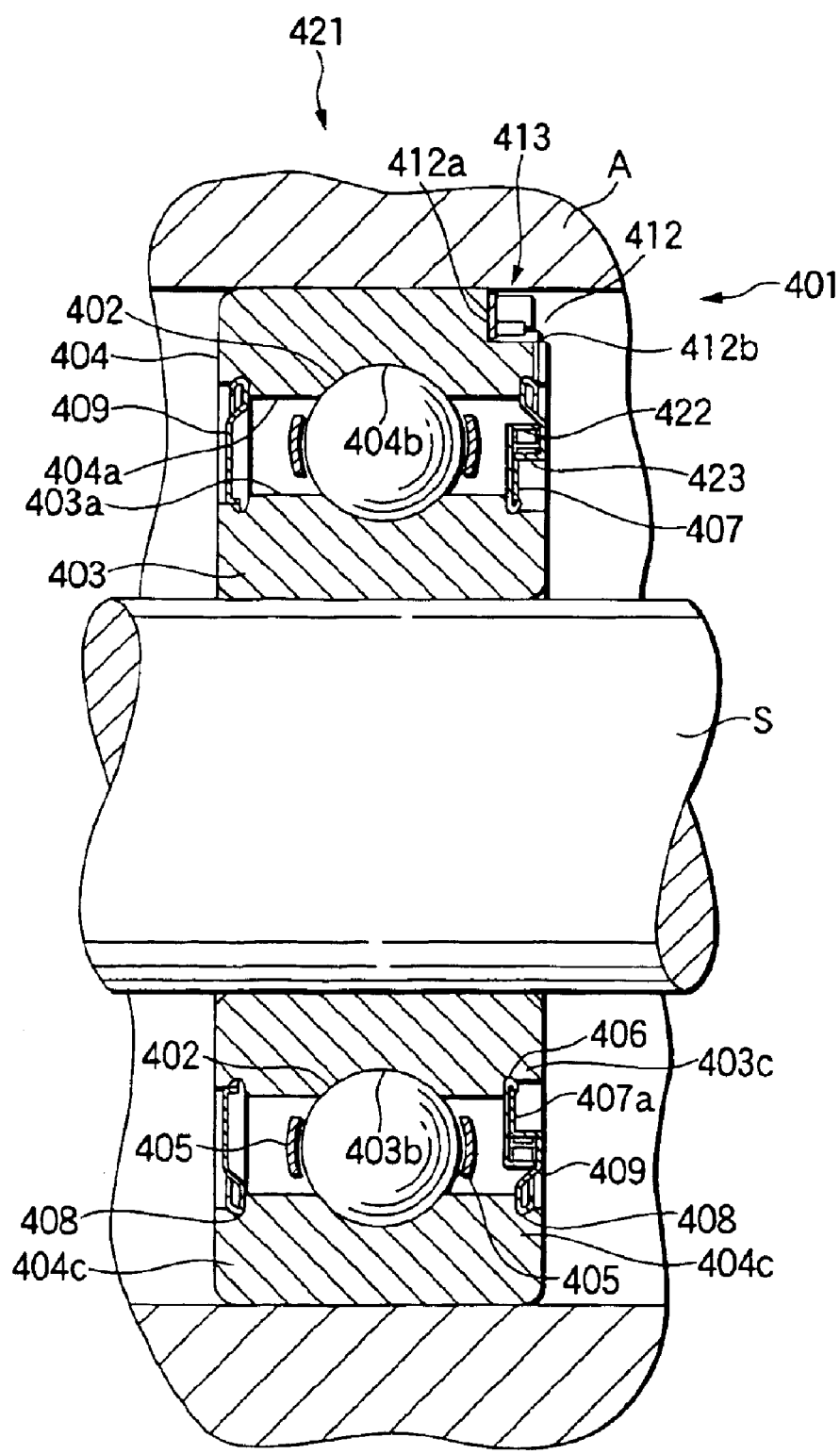
FIG. 33 is a sectional view showing a bearing device with sensor, which is a twenty-third embodiment of the invention.
Figure 34:
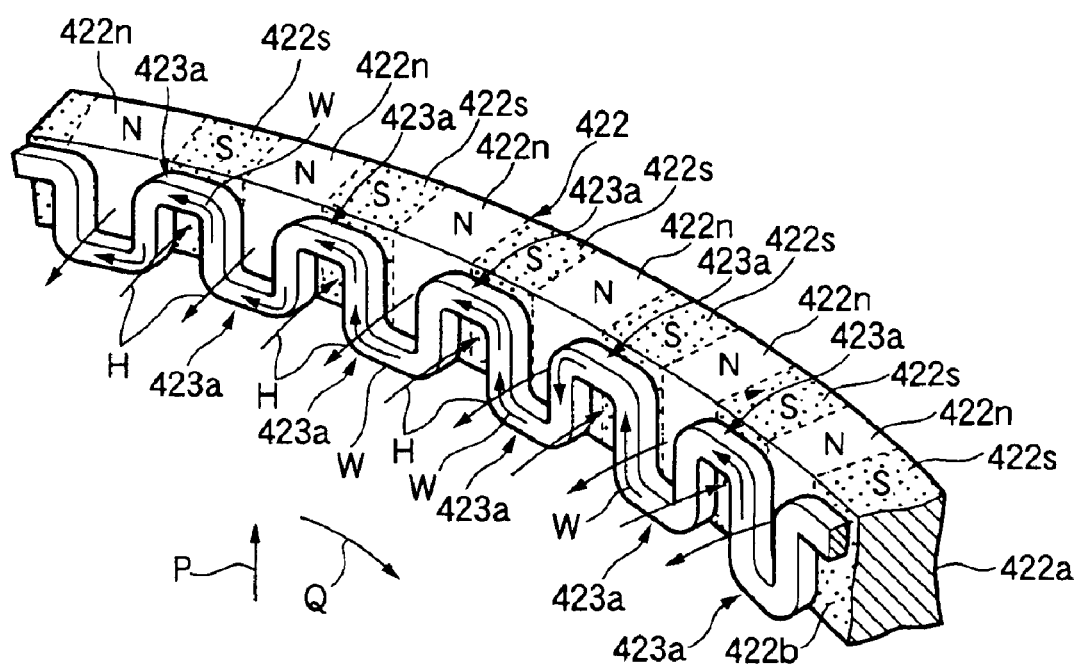
FIG. 34 is a perspective view showing a part of a structure including a magnet and a conductor of the bearing device with sensor of FIG. 33.

A magnet 422 of the bearing device with sensor 421 shown in FIG. 33 is annularly shaped while extending in a circumferential direction Q of the bearing device with sensor 421. Its outer peripheral surface 422a is supported on the first shield 407. As shown in FIG. 34, a conductor 423 extends in a circumferential direction Q of the bearing device with sensor 421, while being rectangularly meandered along a cylindrical surface developed about the rotational axis of the inner ring 403 and at intervals each equal to the pole-to-pole distance of the magnet 410. Specifically, the conductor 423 annularly extends while being spaced from the inner peripheral surface 422b of the magnet 422 by a fixed gap. In the twenty-third embodiment, the conductor 423 is located on the inner side of the magnet 422 as radially viewed. If required, the conductor 423 may be located on the outer side thereof.

In the bearing device with sensor 421 of the single-row deep groove ball bearing type as shown in FIG. 33, the magnet 422 and the conductor 423 may be assembled at a good concentricity. Accordingly, if the magnet 422 and the conductor 423 are radially disposed in a state that the cylindrical surfaces of those members are confronted with each other, a variation of an electric power generated through the rotation of the magnet 422 relative to the conductor 423 is reduced.

In the bearing device with sensor of the thrust ball bearing type, it is preferable to dispose the magnet 410 and the conductor 411 along the rotating shaft as in the twenty-second embodiment. If so disposed, a variation of the electric power output is reduced.

In the twenty-second and twenty-third embodiments, the first shield 407 on which the magnet 410 (422) of the rolling bearing with sensor 401 (421) is mounted, together with the shafts, is fitted to the rotating inner ring 403, and the second shields 409 on which the conductor 411 (423) is mounted is fitted to the outer ring 409 fixed to the housing A. However, in case that the sensor 413 which needs the electric power is mounted on the inner ring 403, the magnet 410 (422) is provided fixed to the outer ring 404 and the conductor 411 (423) is provided so as to rotate with the inner ring 403.

As described above, in the rolling bearing with sensor 401, the conductor 411 (423) is fixed to the raceway on which the sensor 413 is mounted, and the magnet 410 (422) is disposed so as to rotate relative to the conductor 411 (423). With such a mechanical arrangement, an electromotive force appears between the both ends 411a of the conductor 411, and is supplied to the sensor 413, and the detecting information by the sensor 413 is sent by a radio wave R. In the rolling bearing with sensor, the wiring from the rolling bearing with sensor 401 to exterior is not used, viz., a power cable E for operating the sensor, a communication cable for transmitting the information detected by the sensor, and the like are not used. Therefore, there is eliminated troublesome work of connecting and disconnecting the wires in the assembling/disassembling of the rolling bearing with sensor 401 and its vicinal structure. Accordingly, the cost of the assembling/disassembling work of the structure in the vicinity of the rolling bearing with sensor 401 and replacing the wires is reduced.

When the rolling bearing with sensor 401 (421) of the twenty-second (twenty-third) embodiment is applied to a spindle, e.g., main shaft, of a machine tool, a spindle unit with rotating speed sensor is provided which does not require the reconnection of the power source every time the tool is replaced with another.

Further, in the rolling bearing with sensor 401 (421) of the twenty-second (twenty-third) embodiment, the sensor 413 is not protruded out of a region defined by the both end faces, and the outer and inner peripheries of the rolling bearing with sensor 401 (412). Therefore, the bearing device may easily be replaced with the existing bearing if any machining work is not done for its mounting.

A frequency of AC electromotive force generated by the rolling bearing with sensor 401 (421) in the twenty-second (twenty-third) embodiment is proportional to a rotational speed of the shaft to which the rolling bearing with sensor 401 (421) is mounted, and an amplitude of the AC electromotive force is also proportional to the rotational speed of the shaft. Accordingly, if the rolling bearing with sensor 401 (421) is incorporated into an electric generator to be controlled in rotational speed, there is no need of using a frequency generator (FG) or a tachogenerator, which is provided separately from the electric generator for the purpose of detecting the rotational speed. This results in cost and size reduction of the electric generator.

In the rolling bearing with sensor 401 (421), the magnet 410 and the conductor 411 are disposed over the entire circumference. Accordingly, an AC electromotive force generated for each phase is averaged. Accordingly, even if error factors of the AC electromotive force exist, an frequency error of the AC electromotive force with respective to the rotational speed of the bearing is very small. Those error factors are magnetizing pitch (interval at which it is magnetized to N and S poles) of the magnet 410, magnetizing intensity, irregularity of magnetizing pitch (interval at which the conductor is meandered) of the magnet 410, misalignment of the magnet 410 with the conductor 411, and others.

An electric generator, which is small in rotational speed irregularity, and low in cost and size, may be realized if the rolling bearing with sensor 401 (421) is provided on the rotating shaft of an electric generator or the like, a frequency of an AC electromotive force generated by the rolling bearing with sensor 401 (421) and a reference frequency produced by a quartz vibrator are input to a PLL (phase locked loop) circuit, and a rotational speed of the electric generator is controlled in accordance with a phase difference.

Where the dust- and water-proof seals are used for the rolling bearing with sensor, the first and second shields or first to third shields as electric generators may be disposed outside the seals. In a case where a position near zero rotation of the shaft to which the rolling bearing with sensor is attached is detected, it is preferable to use an active type rotational speed sensor, such as a Hall element (IC) or an MR element, additionally. Also when the rotational speed is not measured, the electric generator that is constructed with the annular magnet and conductor is stable in the frequency and amplitude of an AC electromotive force generated. Accordingly, it may be used as a stable source capable of supplying quality electric power.

The mounting position of the power source 413 in each embodiment is not limited to the recess 412 formed at a part of the outer ring 404. If required, a recess is formed at a part of the inner ring 403. Further, it may be attached to the end face of the inner or outer ring.

It should be understood that the present invention is not limited to the above-mentioned embodiments, but may variously be modified, altered and changed within the scope of the invention.

As seen from the foregoing description, the invention succeeds in providing a rolling bearing with sensor having an electric generator and a sensor. The electric generator includes a bearing having a pair of raceway rings being rotatable relative to each other with the aid of rolling elements being interposed therebetween, an annular magnet supported on the first raceway ring of the bearing, N and S poles being alternately disposed in the circumferential direction of the bearing, and an annular conductor supported on the second raceway of the bearing, the annular conductor rotating relative to the magnet, thereby generating an electromotive force. The sensor detects a rotational speed of the first raceway ring relative to the second raceway ring on the basis of electric power output from the electric generator. In the thus constructed rolling bearing with sensor, the magnet and the conductor cooperate to provide a function of the electric generator, and also a function of a sensor for detecting a rotational speed of the bearing. Accordingly, the rolling bearing does not need the supply of electric power from an external power source in order to operate the sensor, and is capable of detecting a rotational speed of the bearing.

In the electric generator, the magnet is magnetized so as to have the N and S poles being arranged alternately and in the circumferential direction, is annular in shape and preferably arranged at equal intervals. The conductor, annularly shaped, extends, while being meandered, in a direction in which the conductor crosses the magnetic lines developed from the magnet, specifically, in the radial direction of the bearing or in the axial direction of said bearing and along said magnet and a cylindrical surface developed about the rotational axis of the bearing. The magnet and the conductor are annularly shaped. Accordingly, when the magnet and the conductor rotate relative to each other, an electromotive force is always generated irrespective of their rotational positions. The electromotive force appearing at both ends of the conductor a little varies even when the dimensional uniformity is lost of the circularity deviation and concentricity of each of the magnet and the conductor, distance between them, pole-to-pole distance, meandering interval, and the like. Thus, the outputting of the electromotive force generated through the relative rotation of the magnet to the conductor is stabilized, and a rotational speed measured based on the electromotive force may be detected at high accuracy.

What is claimed is:

1. A rolling bearing, comprising:
   an inner ring;
   an outer ring;
   a plurality of rolling elements disposed between said inner ring and said outer ring;
   a retainer for retaining said rolling elements; and
   a ring secured to at least one of said inner ring and said outer ring, wherein said ring includes:
      a sensor having a detecting part, said detecting part detecting at least one of a temperature and a vibration,
      a transmitting part transmitting an output of said detecting part or a signal obtained by processing said output,
      a control part controlling said transmitting part on the basis of said output of said detecting part, and
      a power source for supplying power to said detecting part and said transmitting part.

2. The rolling bearing according to claim 1, wherein:
   said transmitting part transmits a constant signal at predetermined intervals; and
   a receiving device, apart from said transmitting part, receives said constant signal for confirming that said sensor, said transmitting part, and said control part, operate normally.

3. A rolling bearing with sensor, comprising:
   an inner ring;
   an outer ring;
   a plurality of rolling elements disposed between said inner and outer rings; and
   a sensor having a detecting part detecting a state of said rolling bearing and a circuit part connected to said detecting part,
   wherein said detecting part and said circuit part are directly attached to said rolling bearing, and
   wherein said detecting part and said circuit part are directly attached to at least one of said inner and outer rings along a circumferential direction thereof.

4. The rolling bearing with sensor according to claim 3, further comprising:
   a surface-opposed electric generator having a coil provided on one of said inner and outer rings and a magnet provided on the other.

5. The rolling bearing with sensor according to claim 3, wherein said sensor detects at least one of a rotating speed, a vibration, a temperature and a humidity.

6. A rolling bearing with sensor, comprising:
   an inner ring;
   an outer ring;
   a plurality of rolling elements disposed between said inner and outer rings; and
   a sensor having a detecting part detecting a state of said rolling bearing and a circuit part connected to said detecting part,
   wherein said detecting part and said circuit part are directly attached to said rolling bearing, and
   wherein at least one of said detecting part and said circuit part is attached to an end face of at least one of said inner and outer rings.

7. The rolling bearing with sensor according to claim 6, further comprising:
   a cover attached to said one of said inner and outer rings having said detecting part, for covering said detecting part.

8. The rolling bearing with sensor according to claim 6, further comprising:
   a surface-opposed electric generator having a coil provided on one of said inner and outer rings and a magnet provided on the other.

9. The rolling bearing with sensor according to claim 6, wherein said sensor detects at least one of a rotating speed, a vibration, a temperature and a humidity.

10. The rolling bearing with sensor according to claim 6, wherein said circuit part includes a transmitting part converting a signal detected by said detecting part into a radio wave and transmitting said radio wave.

11. The rolling bearing with sensor according to claim 10, wherein oscillation frequency generated by said transmitting part is selectingly detectable.

12. A rolling bearing with sensor, comprising:
an inner ring;
an outer ring;
a plurality of rolling elements disposed between said inner and outer rings;
a sensor having a detecting part detecting a state of said rolling bearing and a circuit part connected to said detecting part; and
a printed circuit board mounting said detecting part and said circuit part, said printed circuit board being attached to a surface of at least one of said inner and outer rings,
wherein said detecting part and said circuit part are attached to said rolling bearing.

13. The rolling bearing with sensor according to claim 12, wherein said sensor detects at least one of a rotating speed, a vibration, a temperature and a humidity.

14. The rolling bearing with sensor according to claim 12, wherein at least one of said detecting part and said circuit part is molded by an insulating material.

15. The rolling bearing with sensor according to claim 12, further comprising:
a shield for protecting rolling surfaces of said inner and outer rings and said rolling elements; and
a printed circuit board mounting said detecting part and said circuit part, said printed circuit board being attached to said shield.

16. The rolling bearing with sensor according to claim 12, further comprising:
a shield for protecting rolling surfaces of said inner and outer rings and said rolling elements; and
a detecting part detecting a humidity and being located within a space surrounded by said inner and outer rings and said shield supported to one of said inner and outer rings.

17. The rolling bearing with sensor according to claim 12, further comprising:
a surface-opposed electric generator having a coil provided on one of said inner and outer rings and a magnet provided on the other.

18. The rolling bearing with sensor according to claim 12, wherein said circuit part includes a transmitting part converting a signal detected by said detecting part into a radio wave and transmitting said radio wave.

19. A rolling bearing with sensor, comprising:
an inner ring;
an outer ring;
a plurality of rolling elements disposed between said inner and outer rings; and
a sensor having a detecting part detecting a state of said rolling bearing and a circuit part connected to said detecting part,
wherein said detecting part and said circuit part are attached to said rolling bearing,
wherein said sensor detects at least one of a rotating speed, a vibration, a temperature and a humidity,
wherein at least one of said detecting part and said circuit part is attached to said outer ring along a circumferential direction thereof, and
wherein said outer ring is formed with an annular groove for mounting said circuit part so that said circuit part is disposed inside of a prolongation of an end face of said outer ring and inside of a prolongation of an outer peripheral surface of said outer ring.

20. The rolling bearing with sensor according to claim 18, wherein oscillation frequency generated by said transmitting part is selectingly detectable.

21. A rolling bearing with sensor, comprising:
an inner ring;
an outer ring;
a plurality of rolling elements disposed between said inner and outer rings; and
a sensor having a detecting part detecting a state of said rolling bearing and a circuit part connected to said detecting part,
wherein said detecting part and said circuit part are attached to said rolling bearing,
wherein said sensor detects at least one of a rotating speed, a vibration, a temperature and a humidity,
wherein at least one of said detecting part and said circuit part is attached to said inner ring along a circumferential direction thereof, and
wherein said inner ring is formed with an annular groove for mounting said circuit part so that said circuit part is disposed inside of a prolongation of an end face of said inner ring and outside of a prolongation of an inner peripheral surface of said inner ring.

22. A rolling bearing with sensor, comprising:
an inner ring;
an outer ring;
a plurality of rolling elements disposed between said inner and outer rings; and
a sensor having a detecting part detecting a state of said rolling bearing and a circuit part connected to said detecting part,
wherein said detecting part and said circuit part are attached to said rolling bearing, and
wherein said detecting part is attached to a recessed part formed by cutting a part of an end face of at least one of said outer and inner rings.

23. The rolling bearing with sensor according to claim 22, wherein said sensor detects at least one of a rotating speed, a vibration, a temperature and a humidity.

24. The rolling bearing with sensor according to claim 22, wherein at least one of said detecting part and said circuit part is molded by an insulating material.

25. The rolling bearing with sensor according to claim 22, further comprising:
a shield for protecting rolling surfaces of said inner and outer rings and said rolling elements; and
a printed circuit board mounting said detecting part and said circuit part, said printed circuit board being attached to said shield.

26. The rolling bearing with sensor according to claim 22, further comprising:
a shield for protecting rolling surfaces of said inner and outer rings and said rolling elements; and
a detecting part detecting a humidity and being located within a space surrounded by said inner and outer rings and said shield supported to one of said inner and outer rings.

27. The rolling bearing with sensor according to claim 22, further comprising:
a surface-opposed electric generator having a coil provided on one of said inner and outer rings and a magnet provided on the other.

28. The rolling bearing with sensor according to claim 22, wherein said circuit part includes a transmitting part converting a signal detected by said detecting part into a radio wave and transmitting said radio wave.

29. The rolling bearing with sensor according to claim 28, wherein oscillation frequency generated by said transmitting part is selectingly detectable.

30. A rolling bearing with sensor, comprising:
an inner ring;
an outer ring;
a plurality of rolling elements disposed between said inner and outer rings; and
a sensor having a detecting part detecting a state of said rolling bearing and a circuit part connected to said detecting part,
wherein said detecting part and said circuit part are attached to said rolling bearing,
wherein said sensor detects at least one of a rotating speed, a vibration, a temperature and a humidity, and
wherein said detecting part for detecting the vibration includes a detector utilizing a micro mechanism with movable part and fixed part, and a vibration detecting value of said detector is set by changing an elastic modulus of said movable part.

31. A rolling bearing with sensor, comprising:
an inner ring;
an outer ring;
a plurality of rolling elements disposed between said inner and outer rings; and
a sensor having a detecting part detecting a state of said rolling bearing and a circuit part connected to said detecting part,
wherein said detecting part and said circuit part are attached to said rolling bearing, and
wherein said circuit part includes an ultrasonic wave generating part converting a signal detected by said detecting part into an ultrasonic wave, and transmitting the converted ultrasonic wave.

32. A rolling bearing with sensor comprising:
an inner ring;
an outer ring;
a plurality of rolling elements disposed between said inner and outer rings; and
a sensor having a detecting part detecting a state of said rolling bearing and a circuit part connected to said detecting part,
wherein said detecting part and said circuit part are attached to said rolling bearing,
wherein at least one of said detecting part and said circuit part is attached to at least one of said inner and outer rings along a circumferential direction thereof, and
further wherein said circuit part includes a transmitting part converting a signal detected by said detecting part into a radio wave and transmitting said radio wave.

33. The rolling bearing with sensor according to claim 32, wherein oscillation frequency generated by said transmitting part is selectingly detectable.

* * * * *